US010694262B1

(12) United States Patent
Hedman et al.

(10) Patent No.: US 10,694,262 B1
(45) Date of Patent: Jun. 23, 2020

(54) OVERLAYING ADS ON CAMERA FEED IN AUTOMOTIVE VIEWING APPLICATIONS

(71) Applicant: Ambarella International LP, Santa Clara, CA (US)

(72) Inventors: Greg Hedman, San Jose, CA (US); Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/299,394

(22) Filed: Mar. 12, 2019

(51) Int. Cl.
| | |
|---|---|
| *H04N 7/10* | (2006.01) |
| *H04N 21/81* | (2011.01) |
| *H04N 21/414* | (2011.01) |
| *H04N 21/234* | (2011.01) |
| *H04N 21/44* | (2011.01) |
| *H04N 21/4223* | (2011.01) |

(52) U.S. Cl.
CPC ..... *H04N 21/812* (2013.01); *H04N 21/23424* (2013.01); *H04N 21/41422* (2013.01); *H04N 21/4223* (2013.01); *H04N 21/44008* (2013.01)

(58) Field of Classification Search
CPC ............ H04N 21/812; H04N 21/4223; H04N 21/41422; H04N 21/44008; H04N 21/23424
USPC ........................................................ 725/32
See application file for complete search history.

(56) References Cited

U.S. PATENT DOCUMENTS

| | | | | | |
|---|---|---|---|---|---|
| 5,511,000 | A * | 4/1996 | Kaloi | ...................... | G11C 7/16 704/201 |
| 5,682,171 | A * | 10/1997 | Yokoi | ..................... | A63F 13/00 345/7 |
| 5,690,551 | A * | 11/1997 | Taki | ....................... | A63F 13/02 463/32 |
| 5,808,591 | A * | 9/1998 | Mantani | ............. | G02B 27/2228 345/82 |
| 6,078,349 | A * | 6/2000 | Molloy | ................. | G06F 3/0481 348/14.07 |
| 6,195,640 | B1 * | 2/2001 | Mullaly | .................. | G06F 3/013 345/156 |
| 6,307,526 | B1 * | 10/2001 | Mann | ................... | G02B 27/017 345/7 |
| 6,959,450 | B1 * | 10/2005 | Ritter | ................. | H04N 7/17318 725/133 |
| 8,196,064 | B2 * | 6/2012 | Krzyzanowski | .... | H04L 12/2816 715/711 |
| 8,290,341 | B2 * | 10/2012 | Hirata | ................. | G11B 27/105 386/248 |
| 8,578,407 | B1 * | 11/2013 | Redol | ............... | G06Q 30/0241 725/32 |

(Continued)

*Primary Examiner* — Michael B. Pierorazio
(74) *Attorney, Agent, or Firm* — Christopher P. Maiorana, PC

(57) ABSTRACT

An apparatus includes a capture device and a processor. The capture device may be configured to generate video frames of an environment near a vehicle. The processor may be configured to receive video frames from the capture device, perform video operations to detect objects in the video frames, determine advertisement locations in the video frames based on the objects detected in the video frames, insert advertisements at the advertisement locations and generate video data for a display. The video data may comprise the video frames with the inserted advertisements.

18 Claims, 14 Drawing Sheets

(56) References Cited

U.S. PATENT DOCUMENTS

| | | | | |
|---|---|---|---|---|
| 8,893,164 B1* | 11/2014 | Teller | H04N 21/4307 | 725/12 |
| 8,966,512 B2* | 2/2015 | Sivertsen | H04N 21/4312 | 725/10 |
| 10,516,901 B2* | 12/2019 | Martin | H04N 21/812 | |
| 2002/0085843 A1* | 7/2002 | Mann | E03C 1/057 | 396/374 |
| 2002/0141614 A1* | 10/2002 | Lin | G06F 3/013 | 382/103 |
| 2003/0212996 A1* | 11/2003 | Wolzien | G01C 21/28 | 725/60 |
| 2005/0108092 A1* | 5/2005 | Campbell | A61B 3/113 | 705/14.64 |
| 2006/0256133 A1* | 11/2006 | Rosenberg | G06F 3/013 | 345/619 |
| 2007/0050253 A1* | 3/2007 | Biggs | G06Q 30/02 | 705/14.67 |
| 2007/0165964 A1* | 7/2007 | Wolf | G06F 9/451 | 382/276 |
| 2008/0022569 A1* | 1/2008 | Winn | G09F 25/00 | 40/457 |
| 2008/0111833 A1* | 5/2008 | Thorn | G09G 5/00 | 345/690 |
| 2008/0147488 A1* | 6/2008 | Tunick | G06Q 30/02 | 705/7.29 |
| 2010/0053555 A1* | 3/2010 | Enriquez | A61B 3/113 | 351/210 |
| 2010/0080418 A1* | 4/2010 | Ito | G06K 9/00228 | 382/103 |
| 2011/0161163 A1* | 6/2011 | Carlson | G06Q 30/02 | 705/14.44 |
| 2011/0213664 A1* | 9/2011 | Osterhout | G02B 27/017 | 705/14.58 |
| 2011/0255010 A1* | 10/2011 | Sakai | H04N 5/4401 | 348/730 |
| 2011/0292181 A1* | 12/2011 | Acharya | G06F 3/011 | 348/47 |
| 2012/0075168 A1* | 3/2012 | Osterhout | G02B 27/017 | 345/8 |
| 2012/0192241 A1* | 7/2012 | Cho | G01C 21/00 | 725/116 |
| 2012/0194418 A1* | 8/2012 | Osterhout | G02B 27/0093 | 345/156 |
| 2012/0194419 A1* | 8/2012 | Osterhout | G02B 27/0093 | 345/156 |
| 2012/0194420 A1* | 8/2012 | Osterhout | G02B 27/0093 | 345/156 |
| 2012/0194549 A1* | 8/2012 | Osterhout | G02B 27/0093 | 345/633 |
| 2012/0194550 A1* | 8/2012 | Osterhout | G02B 27/0093 | 345/633 |
| 2012/0194551 A1* | 8/2012 | Osterhout | G02B 27/0093 | 345/633 |
| 2012/0194552 A1* | 8/2012 | Osterhout | G02B 27/0093 | 345/633 |
| 2012/0194553 A1* | 8/2012 | Osterhout | G02B 27/0093 | 345/633 |
| 2012/0200488 A1* | 8/2012 | Osterhout | G02B 27/0093 | 345/156 |
| 2012/0200499 A1* | 8/2012 | Osterhout | G02B 27/0093 | 345/158 |
| 2012/0200601 A1* | 8/2012 | Osterhout | G02B 27/0093 | 345/633 |
| 2012/0206322 A1* | 8/2012 | Osterhout | G02B 27/0093 | 345/8 |
| 2012/0206323 A1* | 8/2012 | Osterhout | G02B 27/0093 | 345/8 |
| 2012/0206334 A1* | 8/2012 | Osterhout | G06F 1/163 | 345/156 |
| 2012/0206335 A1* | 8/2012 | Osterhout | G02B 27/0093 | 345/156 |
| 2012/0206485 A1* | 8/2012 | Osterhout | G02B 27/0093 | 345/633 |
| 2012/0212414 A1* | 8/2012 | Osterhout | G02B 27/017 | 345/158 |
| 2012/0212484 A1* | 8/2012 | Haddick | G02B 27/0093 | 345/419 |
| 2012/0212499 A1* | 8/2012 | Haddick | G02B 27/0093 | 345/589 |
| 2012/0300061 A1* | 11/2012 | Osman | G06F 1/3231 | 348/135 |
| 2016/0066060 A1* | 3/2016 | Teller | G06Q 30/0252 | 725/12 |

\* cited by examiner

US 10,694,262 B1

OVERLAYING ADS ON CAMERA FEED IN AUTOMOTIVE VIEWING APPLICATIONS

FIELD OF THE INVENTION

The invention relates to video data generally and, more particularly, to a method and/or apparatus for implementing overlaying ads on camera feed in automotive viewing applications.

BACKGROUND

There is an increasing amount of camera viewing applications in vehicles (i.e., eMirrors, around view monitor (AVM), augmented reality overlays for navigation, back-up cameras, etc.). Furthermore, vehicle sensors enable increased understanding of the surroundings. Vehicles can be equipped with constant LTE connectivity to the cloud, which provides opportunities for new applications. Increasing levels of autonomous and semi-autonomous vehicle control also provide an opportunity to supply the driver with more information when the driver is not engaged in safety critical control of the car.

It would be desirable to implement overlaying ads on camera feed in automotive viewing applications.

SUMMARY

The invention concerns an apparatus comprising a capture device and a processor. The capture device may be configured to generate video frames of an environment near a vehicle. The processor may be configured to receive video frames from the capture device, perform video operations to detect objects in the video frames, determine advertisement locations in the video frames based on the objects detected in the video frames, insert advertisements at the advertisement locations and generate video data for a display. The video data may comprise the video frames with the inserted advertisements.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing overlaying ads on camera feed in automotive viewing applications that may (i) detect appropriate locations for overlaying advertisements, (ii) format advertisements to fit a location, (iii) select advertisements based on a context, (iv) pull advertisements from a network, (v) adjust advertisement display based on driving conditions, (vi) display advertisements on various in-car displays and/or (vii) be implemented as one or more integrated circuits.

Embodiments of the invention may be configured to develop an understanding of the environment near a vehicle through GPS and computer vision. Using the understanding of the environment, embodiments of the invention may be configured to intelligently overlay and/or insert advertisements into a video feed (e.g., a live feed displayed to an occupant of a vehicle). The intelligent overlay and/or insertion of advertisements may be handled to ensure safety and prevent distraction.

Figure 1:
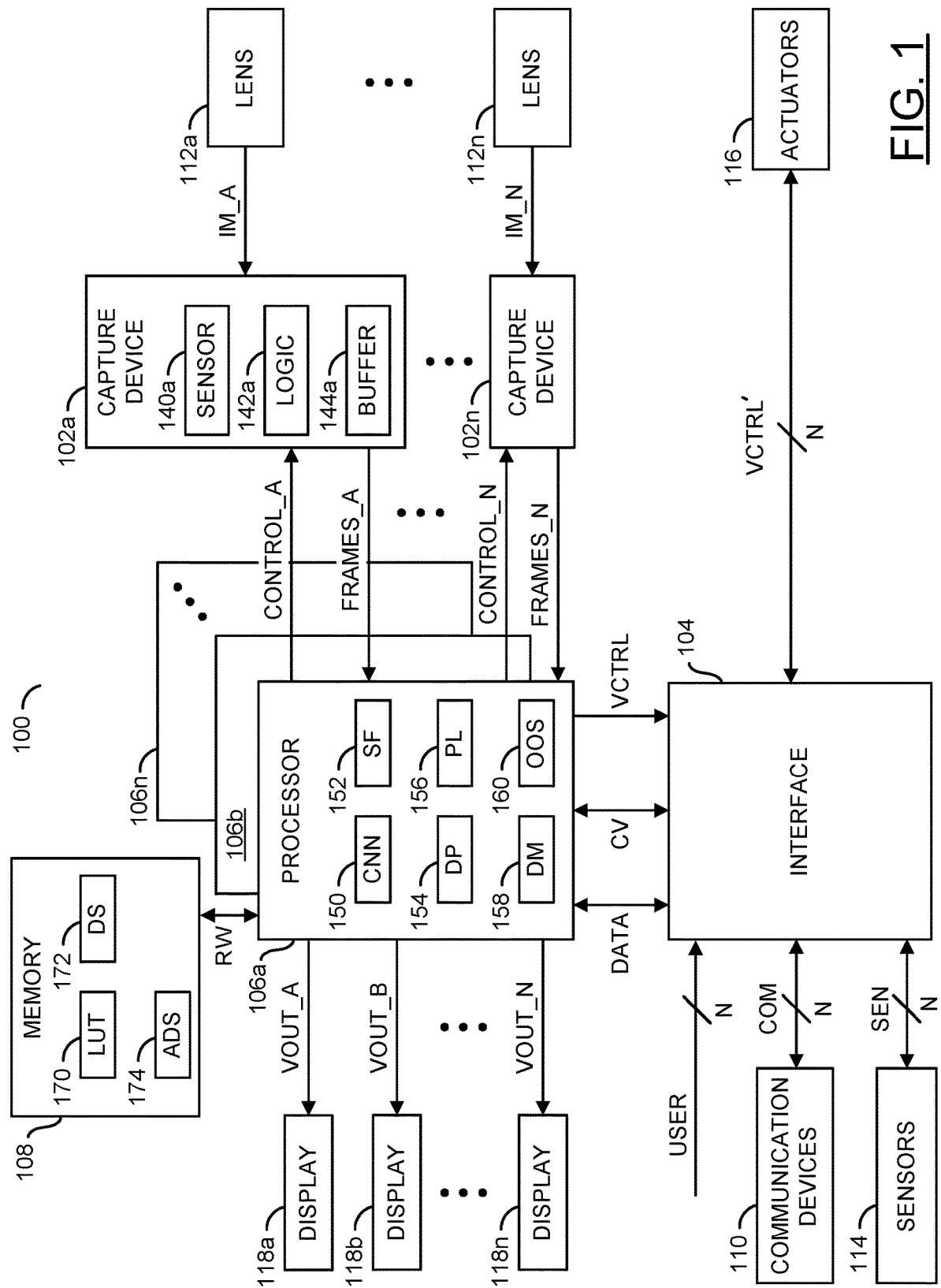
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n. In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N, to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement advertisement storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the displays 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The advertisement storage 174 may comprise various advertisements stored by the memory 108. The advertisements may be used by the processors 106a-106n to overlay and/or embed an advertisement notification in the output video data (e.g., the signals VOUT_A-VOUT_N). The advertisement storage 174 may provide local storage for advertisements. The advertisements stored may be updated (e.g., received by the communication devices 110). The types of advertisements and/or the format of the advertisements in the advertisement storage 174 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be an encoded, cropped, stitched and/or enhanced versions of one or more of the signals FRAMES_A-FRAMES_N. The signals VOUT_A-VOUT_N may be a high resolution, digital, encoded, de-warped, stabilized, cropped, blended, stitched and/or rolling shutter effect corrected versions of the signals FRAMES_A-FRAMES_N.

Figure 2:
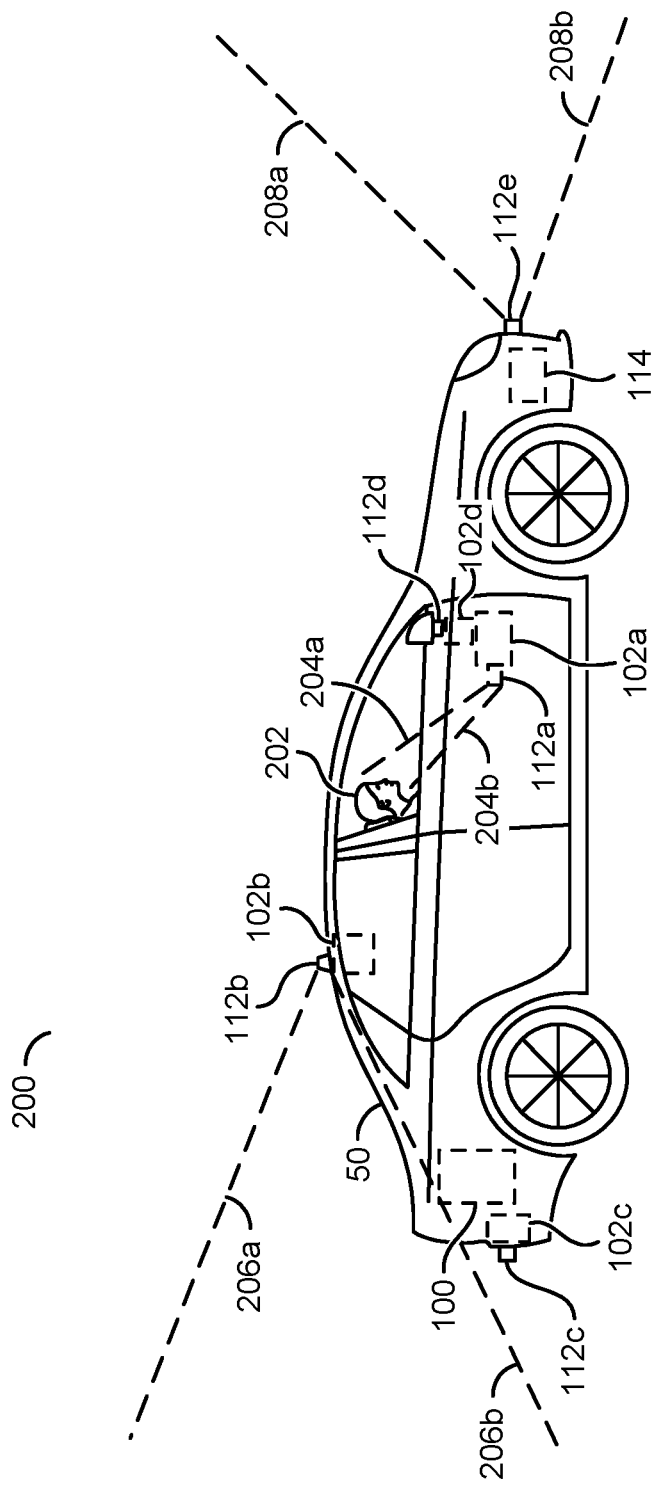
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
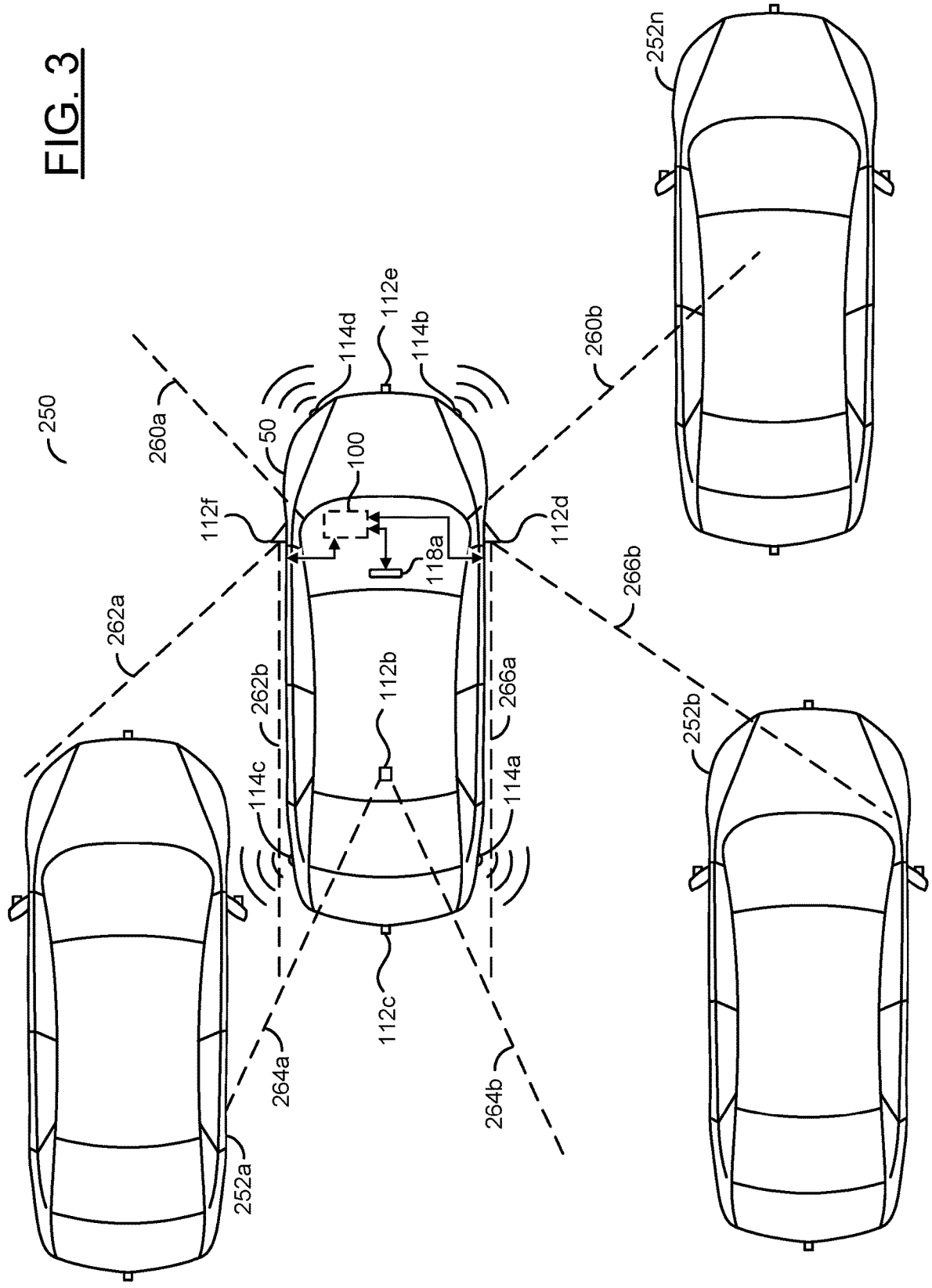
FIG. 3 is a diagram illustrating an overhead view of a vehicle in traffic.

Referring to FIG. 3, a diagram illustrating an overhead view 250 of the vehicle 50 in traffic is shown. The traffic may comprise other vehicles 252a-252n. The ego vehicle 50 is shown slightly ahead and to the right of the vehicle 252a and slightly ahead and to the left of the vehicle 252b. The ego vehicle 50 is shown slightly behind and to the left of the vehicle 252n.

The apparatus 100 is shown within the ego vehicle 50. The lenses 112a-112f are shown on the ego vehicle 50. The sensors 114a-114d are shown located on the outside of the ego vehicle 50. The display 118a is shown within the ego vehicle 50. While only one of the displays 118a is shown as a representative example, generally the ego vehicle 50 may comprise more than one of the displays 118a-118n. Each of the lenses 112a-112f may be directed to capture a different field of view. In an example, each of the fields of view captured by the lenses 112a-112f may be presented as video data to the displays 118a-118n.

Dotted lines 260a-260b are shown extending from a windshield of the ego vehicle 50. The dotted lines 260a-260b may represent the field of view (e.g., the direction of the gaze) of the driver 202. The gaze 260a-260b may be a representative example of the gaze of the driver 202 when the driver 202 is looking forward out the windshield (e.g., looking out at the roadway and not looking at one of the displays 118a-118n). In one example, the processors 106a-106n may be configured to detect where the driver 202 is looking based on a determined field of view of the driver 202 and estimate the gaze direction information. The processors 106a-106n may use the gaze direction information to determine the gaze 260a-260b.

The processors 106a-106n may use the gaze direction information to determine that the driver 202 is looking out the front windshield and determine the gaze 260a-260b. The processors 106a-106n may be further configured to perform computer vision operations on the video data captured using the lens 112e (which may provide an approximation of what the driver 202 may see in front of the ego vehicle 50). For example, the computer vision operations performed by the processors 106a-106n may be configured to detect that the vehicle 252n may be visible. The sensor fusion module 152 may be configured to combine the detection of the vehicle 252n from the video data captured using the lens 112e with a detection of objects using the proximity sensor 114b. The sensor fusion module 152 may be further configured to weight the information received from the computer vision operations. For example, since the vehicle 252n may be on the periphery of the gaze 260a-260b there may be an increased likelihood that the driver 202 may not notice the vehicle 252n, even though the vehicle 252n is within the current gaze direction 260a-260b of the driver 202. Based on the detections by the processors 106a-106n corresponding with the field of view of the lens 112e, the processors 106a-106n may be configured to infer what the driver 202 sees when looking out the windshield of the ego vehicle 50. In the example shown, the apparatus 100 may be configured to infer that when the driver 202 is looking out the front windshield, the driver 202 may have a chance to see the vehicle 252n and may not see the vehicles 252a-252b.

Dotted lines 262a-262b are shown extending from the lens 112f on the driver side of the ego vehicle 50. The dotted lines 262a-262b may represent the field of view (e.g., the direction of the gaze) of the driver 202. The gaze 262a-262b may be a representative example of the gaze of the driver 202 when the driver 202 is looking at one of the displays 118a-118n. For example, one of the displays 118a-118n (e.g., 118a) may display the video data captured using the lens 112f and when the driver 202 looks at the display 118a, the driver 202 may be able to see a rearward view from the driver side of the ego vehicle 50 (e.g., a view similar to and/or emulating using a reflective driver side mirror).

The processors 106a-106n may use the gaze direction information to determine that the driver 202 is looking at one of the displays 118a-118n, determine the video data displayed (e.g., video data captured using the lens 112*f*) and determine the gaze 262*a*-262*b*. The processors 106*a*-106*n* may be further configured to perform computer vision operations on the video data captured using the lens 112*f*. For example, the computer vision operations performed by the processors 106*a*-106*n* may be configured to detect the vehicle 252*a*. The sensor fusion module 152 may be configured to combine the computer vision results from the processors 106*a*-106*n* with the proximity detection performed by the sensor 114*c* (e.g., radar, LIDAR, etc.). Based on the detections by the processors 106*a*-106*n* corresponding with the field of view of the lens 112*f*, the processors 106*a*-106*n* may be configured to infer what the driver 202 sees when looking at the display 118*a*. In the example shown, the apparatus 100 may be configured to infer that when the driver 202 is looking at the display 118*a*, the driver 202 may see the vehicle 252*a*, but not the vehicle 252*b* or the vehicle 252*n*.

Dotted lines 264*a*-264*b* are shown extending from the lens 112*b* on the roof of the ego vehicle 50. The dotted lines 264*a*-264*b* may represent the field of view (e.g., the direction of the gaze) of the driver 202. The gaze 264*a*-264*b* may be a representative example of the gaze of the driver 202 when the driver 202 is looking at one of the displays 118*a*-118*n*. For example, one of the displays 118*a*-118*n* (e.g., 118*b*) may display the video data captured using the lens 112*b* and when the driver 202 looks at the display 118*b*, the driver 202 may be able to see a rearward view from the ego vehicle 50 (e.g., a view similar to and/or emulating using a reflective rearview mirror).

The processors 106*a*-106*n* may use the gaze direction information to determine that the driver 202 is looking at one of the displays 118*a*-118*n*, determine the video data displayed (e.g., video data captured using the lens 112*b*) and determine the gaze 264*a*-264*b*. The processors 106*a*-106*n* may be further configured to perform computer vision operations on the video data captured using the lens 112*b*. For example, the computer vision operations performed by the processors 106*a*-106*n* may be configured to detect that no objects are visible to the rear of the vehicle. The sensor fusion module 152 may be configured to combine the lack of detection of objects from the video data captured using the lens 112*b* with a lack of detection of objects using proximity sensors. Based on the detections by the processors 106*a*-106*n* corresponding with the field of view of the lens 112*b*, the processors 106*a*-106*n* may be configured to infer what the driver 202 sees when looking at the display 118*b*. In the example shown, the apparatus 100 may be configured to infer that when the driver 202 is looking at the display 118*b*, the driver 202 may not see any of the vehicles 252*a*-252*n*.

Dotted lines 266*a*-266*b* are shown extending from the lens 112*d* on the passenger side of the ego vehicle 50. The dotted lines 266*a*-266*b* may represent the field of view (e.g., the direction of the gaze) of the driver 202. The gaze 266*a*-266*b* may be a representative example of the gaze of the driver 202 when the driver 202 is looking at one of the displays 118*a*-118*n*. For example, one of the displays 118*a*-118*n* (e.g., 118*c*) may display the video data captured using the lens 112*d* and when the driver 202 looks at the display 118*c*, the driver 202 may be able to see a rearward view from the passenger side of the ego vehicle 50 (e.g., a view similar to and/or emulating using a reflective passenger side mirror).

The processors 106*a*-106*n* may use the gaze direction information to determine that the driver 202 is looking at one of the displays 118*a*-118*n*, determine the video data displayed (e.g., video data captured using the lens 112*d*) and determine the gaze 266*a*-266*b*. The processors 106*a*-106*n* may be further configured to perform computer vision operations on the video data captured using the lens 112*d*. For example, the computer vision operations performed by the processors 106*a*-106*n* may be configured to detect the vehicle 252*b*. Since the vehicle 252*b* is far away from the ego vehicle 50, the proximity sensor 114*a* may not be able to detect the vehicle 252*b*. The sensor fusion module 152 may be configured to combine the computer vision results from the processors 106*a*-106*n* with the lack of proximity detection performed by the sensor 114*a* (e.g., radar, LIDAR, etc.). For example, the sensor fusion module 152 may be configured to weight the information provided by each sensor (e.g., a confidence level of the computer vision detection, a confidence level of the detection of the sensor 114*a*, the distance limitations of the sensor 114*a*, whether the computer vision detects the vehicle 252*b* at a distance beyond the range of the sensor 114*a*, etc.). Based on the detections by the processors 106*a*-106*n* corresponding with the field of view of the lens 112*d*, the processors 106*a*-106*n* may be configured to infer what the driver 202 sees when looking at the display 118*c*. In the example shown, the apparatus 100 may be configured to infer that when the driver 202 is looking at the display 118*c*, the driver 202 may or may not see the vehicle 252*b* and may not see the vehicle 252*a* or the vehicle 252*n*.

The processors 106*a*-106*n* may be configured to detect events. The event may comprise driving scenarios that warrant a particular amount of attention from the driver 202. For example, whether a detected scenario is considered an event may be determined by the decision module 158. In one example, the event may correspond to detecting that one of the vehicles 252*a*-252*n* may be on a collision course with the ego vehicle 50. In another example, the event may correspond to dense traffic. In yet another example, the event may correspond to signage. The events may be detected based on the computer vision operations performed on the video data captured using the lenses 112*a*-112*n*. The events may be detected based on readings from the sensors 114*a*-114*n*. For example, the sensor fusion module 152 may be configured to combine information determined using the computer vision operations and information detected using the sensors 114*a*-114*n* to make inferences that may be used by the decision module 158.

In one example, the mere presence of the vehicles 252*a*-252*n* may not be enough to be considered an event. However, when one or more of the vehicles 252*a*-252*n* are too close to the ego vehicle 50 and/or are on a collision course with the ego vehicle 50 (e.g., a crash is imminent without corrective actions), then one or more of the vehicles 252*a*-252*n* may be considered an event. In the example shown, the vehicle 252*b* and the vehicle 252*n* may be considered to be far away from the ego vehicle 50 (e.g., non-events). In the example shown, the vehicle 252*a* may be close and/or approaching the ego vehicle 50 and may be a concern to the driver (e.g., the vehicle 252*a* may be considered an event because the vehicle 252*a* may be approaching the ego vehicle 50 or because if the driver 202 changes lanes the ego vehicle 50 would collide with the vehicle 252*a*). In some embodiments, the mere presence of a detected object may be considered an event. In one example, if an emergency vehicle is detected (e.g., ambulance, police car, etc.), the decision module 158 may determine that there is an event. In another example, if there is a pothole, a spill, an accident, a school bus, a towing vehicle on the shoulder, etc. the decision module 158 may determine that there is an event. In yet another example, local laws and/or regulations may define what should be considered an event. The type of detection(s) that the decision module 158 may consider an event may be varied according to the design criteria of a particular implementation.

The processors 106a-106n may be configured to generate ads to be displayed on one or more of the displays 118a-118n. The display selected for the ad insertion may be based partially on the gaze direction (e.g., the gaze 260a-260b, the gaze 262a-262b, the gaze 264a-264b and/or the gaze 266a-266b). The decision module 158 may determine when and where displaying the ad may be appropriate. For example, when the decision module 158 determines that an event has not been detected, the processors 106a-106n may generate the advertisement as part of (or alongside) one or more of the signals VOUT_A-VOUT_N. In one example, the advertisement may be overlaid on top of the video data displayed on the displays 118a-118n. In another example, when the decision module 158 determines that an event has been detected, the processors 106a-106n may not display the advertisement in order to avoid distracting the driver 202.

In some embodiments, the advertisements may be displayed when the processors 106a-106n determine that the attention of the driver 202 may not be compromised by an ad display (e.g., the ego vehicle 50 has a high level of autonomy, a low traffic scenario, when signs comprising instructions are not detected, etc.). In an example, if the decision module 158 determines that the detection of the vehicle 252n is not an event, and the processors 106a-106n determine that the gaze of the driver 202 is the gaze direction 262a-262b (e.g., the driver 202 is looking at the display 118a), then the advertisement may be displayed on the display 118a (e.g., the advertisement may be placed on the display that the driver 202 is currently looking at). In another example, the advertisement may be placed on each of the displays 118a-118n simultaneously. In yet another example if the decision module 158 determines that the detection of the vehicle 252a is an event, no advertisement may be generated regardless of the gaze of the driver 202.

Figure 4:
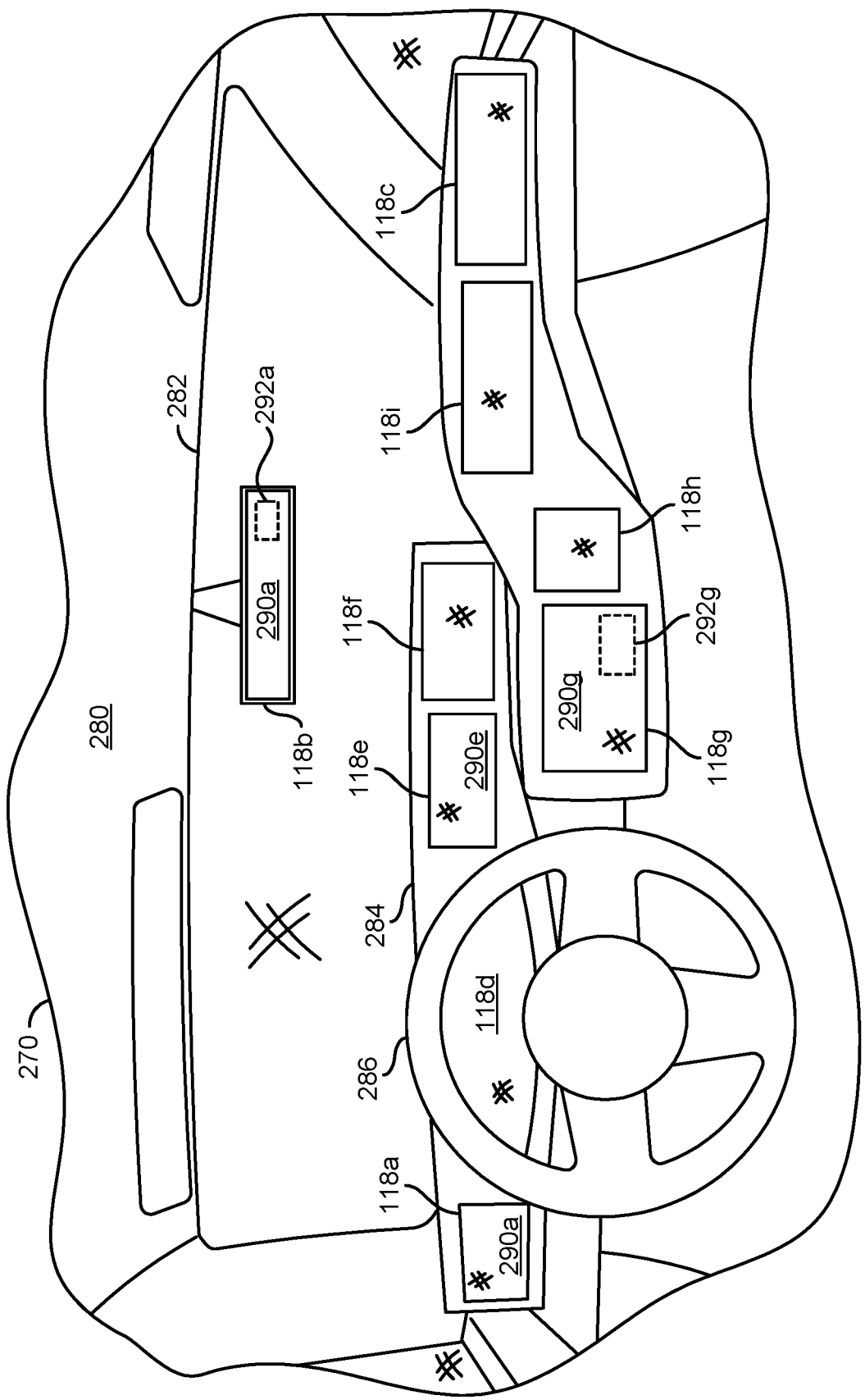
FIG. 4 is a diagram illustrating an interior of a vehicle from the perspective of a driver.

Referring to FIG. 4, a diagram illustrating an interior of the ego vehicle 50 from the perspective of the driver 202 is shown. A perspective 270 is shown. The perspective 270 may be a representation of a view of an interior 280 of the ego vehicle 50. The perspective 270 may generally provide a view of the interior 280 from the location and direction of the driver 202 but may not be what the driver 202 would actually see (e.g., may not be representative of the gaze direction 260a-260b).

The interior 280 of the ego vehicle 50 may comprise a windshield 282, a dashboard 284 and/or a steering wheel 286. A number of the displays 118a-118n are shown. In the example shown, nine displays 118a-118i are shown. However, the number of the displays 118a-118n available in the ego vehicle 50 may be varied according to the design criteria of a particular implementation.

In the example shown, the display 118a may be located on the dashboard 284 to the left of the steering wheel 286. For example, the display 118a may be configured to display video data corresponding to the rear view from the driver side (e.g., emulating a driver side reflective mirror). In the example shown, the display 118b may be located at the top of the windshield 282. For example, the display 118b may be configured to display video data corresponding to the rear view (e.g., emulating a traditional reflective rearview mirror). In the example shown, the display 118c may be located on the dashboard 284 to the far right of the interior 280. For example, the display 118c may be configured to display video data corresponding to the rear view from the passenger side (e.g., emulating a passenger side reflective mirror). Similarly, the display 118d may be located on the dashboard 286 behind the steering wheel 286, and the displays 118e-118i may be located on the dashboard 284 at various locations to the right of the steering wheel 286. In one example, one or more of the displays 118d-118i may be configured to display vehicle information (e.g., warning icons, speed, distance, temperature, odometer, etc.). In another example, one or more of the displays 118d-118i may be configured as an infotainment touchscreen display (e.g., providing a user interface for audio, navigation, hands-free phone communication, etc.).

The processors 106a-106n may be configured to communicate any of the signals VOUT_A-VOUT_N to any of the displays 118a-118i. In an example, the user interface of the infotainment touchscreen (e.g., one of the displays 118a-118n) may be configured to enable the driver 202 (or a passenger in the ego vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the processors 106a-106n may enable the driver 202 to select which of the displays 118a-118i display which video data. For example, the driver 202 may prefer to have the display 118e display the passenger side rear view instead of the display 118c, which is farther away.

The displays 118a-118i may be configured to output video frames 290a-290n corresponding to the output video data VOUT_A-VOUT_N received from the processors 106a-106n. In the example shown, the display 118a is shown outputting the video frame 290a, the display 118b is shown outputting the video frame 290a, the display 118e is shown outputting the video frame 290e and the display 118g is shown outputting the video frame 290g. In the example shown, the display 118a and the display 118b may be outputting the same video frame 290a and some of the displays (e.g., 118c, 118d, 118f, 118h, and 118i) may be off (e.g., not outputting the video frames). Which of the displays 118a-118n displays which of the video frames 290a-290n may be varied according to the design criteria of a particular implementation.

A box 292a is shown on the video frame 290a. A box 292g is shown on the video frame 290g. The box 292a and the box 292g may represent an advertisement. In the example shown, the advertisement 292a may be displayed with the video frame 290a on the display 118b (but not on the display 118a) and the advertisement 292g may be displayed with the video frame 290g on the display 118g. In some embodiments, the processors 106a-106n may insert advertisements 292a-292n (not all shown) on each of the video frames 290a-290n. In some embodiments, the processors 106a-106n may insert more than one of the advertisements 292a-292n on each of the video frames 290a-290n. In some embodiments, the advertisements 292a-292n may be strategically placed by the decision module 158 on particular displays 118a-118n based on the determined gaze of the driver 202. In some embodiments, the advertisements 292a-292n may be inserted on each of the displays 118a-118n. The number, type and/or placement of the advertisements 292a-292n in the video frames 290a-290n and/or on the displays 118a-118n may be varied according to the design criteria of a particular implementation.

In one example, the processors 106a-106n may insert the advertisements 292a-292n in addition to the video data in the video frames 290a-290n (e.g., an overlay on top of the video data). In another example, the processors 106a-106n may insert the advertisements 292a-292n by replacing the video data in the video frames 290a-290n (e.g., replacing the captured video data with the advertisement). The processors 106a-106n may dynamically alter and/or modify the video data (e.g., pixels) in the video frames 290a-290n to insert the advertisements 292a-292n in real time. Since one or more of the displays 118a-118n may function as an electronic mirror (e.g., a replacement for a traditional reflective mirror), introducing a delay to insert the advertisements 292a-292n may affect the safety of operating the ego vehicle 50. Therefore, the processors 106a-106n may be configured with the video pipeline 156 configured to perform the video operations (e.g., including inserting the advertisements 292a-292n) in real time and/or near real time.

The processors 106a-106n may be configured to analyze (e.g., using computer vision operations) the content of the video frames 290a-290n to determine appropriate advertisement locations in the video frames 290a-290n. The advertisement locations may comprise portions of the video data that are suitable (e.g., non-distracting, does not obstruct particular objects, does not obstruct events, etc.) for inserting the advertisements 292a-292n. In some embodiments, the same one of the advertisements 292a-292n may be displayed on each of the video frames 290a-290n. Since each of the video frames 290a-290n shown on the displays 118a-118n may comprise different fields of view (e.g., different objects), the advertisement location for the same one of the advertisements 292a-292n may be different for each of the video frames 290a-290n. The processors 106a-106n may be configured to perform computer vision operations in parallel for each of the incoming video data FRAMES_A-FRAMES_N to determine the advertisement locations and insert the advertisements 292a-292n in real time.

In some embodiments, if a suitable advertisement location is not found (e.g., an event is detected and the advertisement may distract the driver 202), the ads 292a-292n may be displayed on one of the displays 118a-118n operating as an infotainment system screen. In some embodiments, the advertisement content may be read aloud. For example, the processors 106a-106n may be configured to utilize a speaker system of the ego vehicle 50 to output the results of text-to-audio operations performed on the stored advertisements 174. In some embodiments, the advertisement may be a combination of an audio message and the video insertion advertisement 292a-292n.

Figure 5:
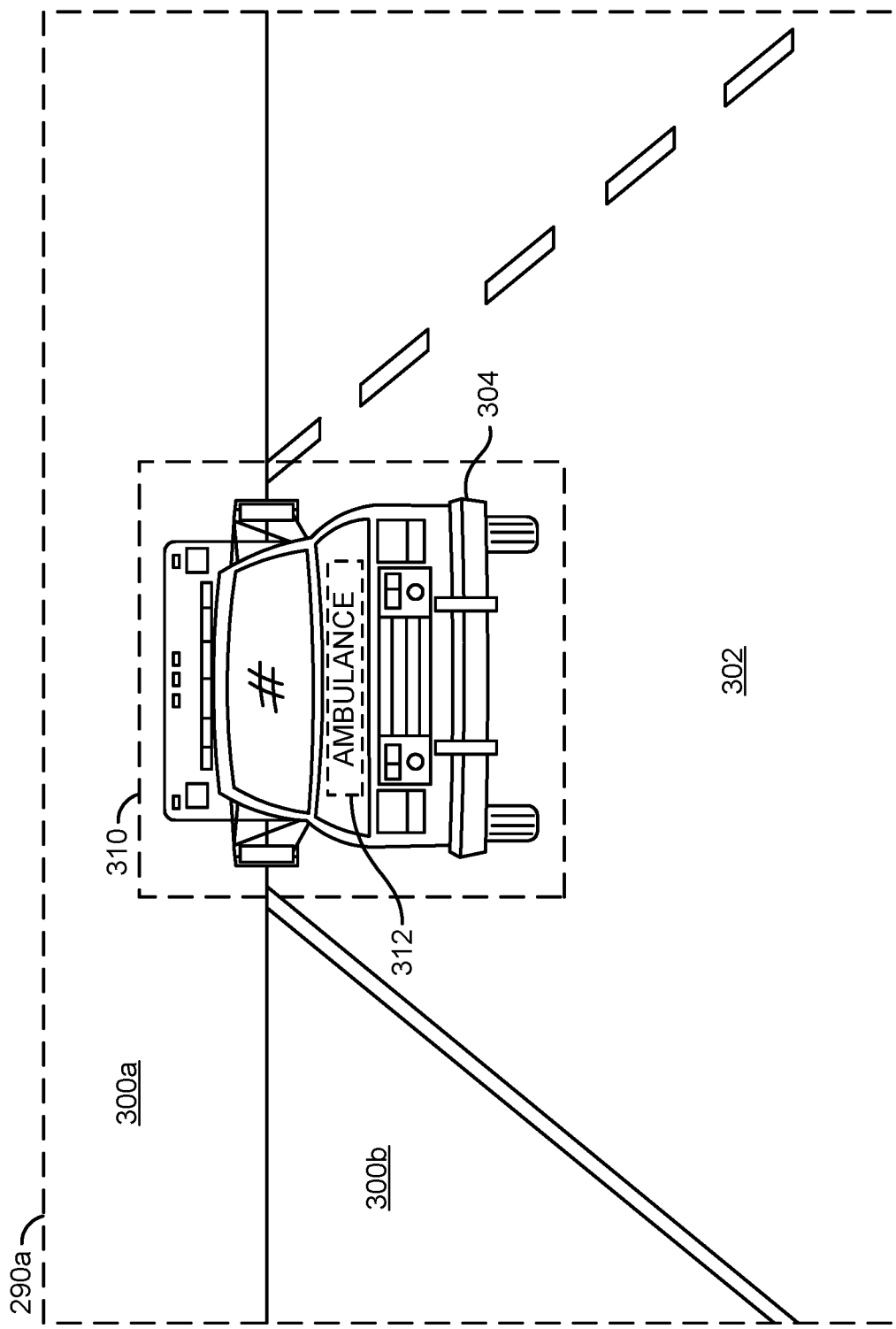
FIG. 5 is a diagram illustrating an example video frame determined to have critical information.

Referring to FIG. 5, a diagram illustrating an example video frame determined to have critical information is shown. An example video frame 290a is shown. For example, the example video frame 290a may be a rear view video frame capture by the lens 112c that may be displayed on the rear view mirror display 118b shown in association with FIG. 4. The example video frame 290a may be one representative video frame of a sequence of video frames. The processors 106a-106n may perform the video operations on the video frames 290a-290n in isolation and in sequence to determine the context of the objects in the video data output to the displays 118a-118n.

The example video frame 290a may comprise non-drivable surfaces 300a-300b. In the example shown, the non-drivable surface 300a may comprise the sky and the non-drivable surface 300b may comprise a non-road surface (e.g., a lawn). The example video frame 290a may comprise a drivable surface 302. The drivable surface 302 may be a road. Generally, suitable and/or appropriate advertisement locations may be on the non-drivable surfaces 300a-300n (e.g., less likely to have critical information and/or events).

An object (e.g., a vehicle) 304 is shown driving on the road 302. In the example shown, the vehicle 304 may be an ambulance. A box 310 is shown around the vehicle 304. The box 310 may represent an object detection in response to the computer vision operations performed by the processors 106a-106n. In one example, the CNN module 150 may compare the object 310 to training data and recognize the vehicle 304 as an ambulance. A box 312 is shown. The box 312 may represent an object detection and/or optical character recognition (OCR) in response to the computer vision operations performed by the processors 106a-106n. In one example, the OCR performed by the CNN module 150 may enable the processors 106a-106a to read the text 'AMBULANCE' printed on the front of the vehicle 304. In another example, the sensor fusion operations performed by the sensor fusion module 152 may be used to make inferences based on the sensor data from the sensors 114 (e.g., detecting the sound of the ambulance siren).

The decision module 158 may make the inference that the vehicle 310 is an ambulance. An ambulance may be an example of an event (e.g., the driver 202 should not be distracted when an ambulance, fire engine, police car, etc. is present). For example, when the ambulance 310 is detected, the decision module 158 may determine that no location on the video frame 290a is an appropriate location for inserting the advertisements 292a-292n.

The processors 106a-106n may be configured to use computer vision operations to detect objects that may be appropriate for overlaying the advertisements 292a-292n. The road 302 may be an example of an inappropriate location. The non-drivable surfaces 300a-300b may be appropriate locations. In some embodiments, the detection of one particular object and/or event may result in the decision module 158 determining that all locations in the video frame 290a are inappropriate advertisement locations. For example, the detection of critical information (e.g., the ambulance 304) may result in no advertisements being inserted.

Figure 6:
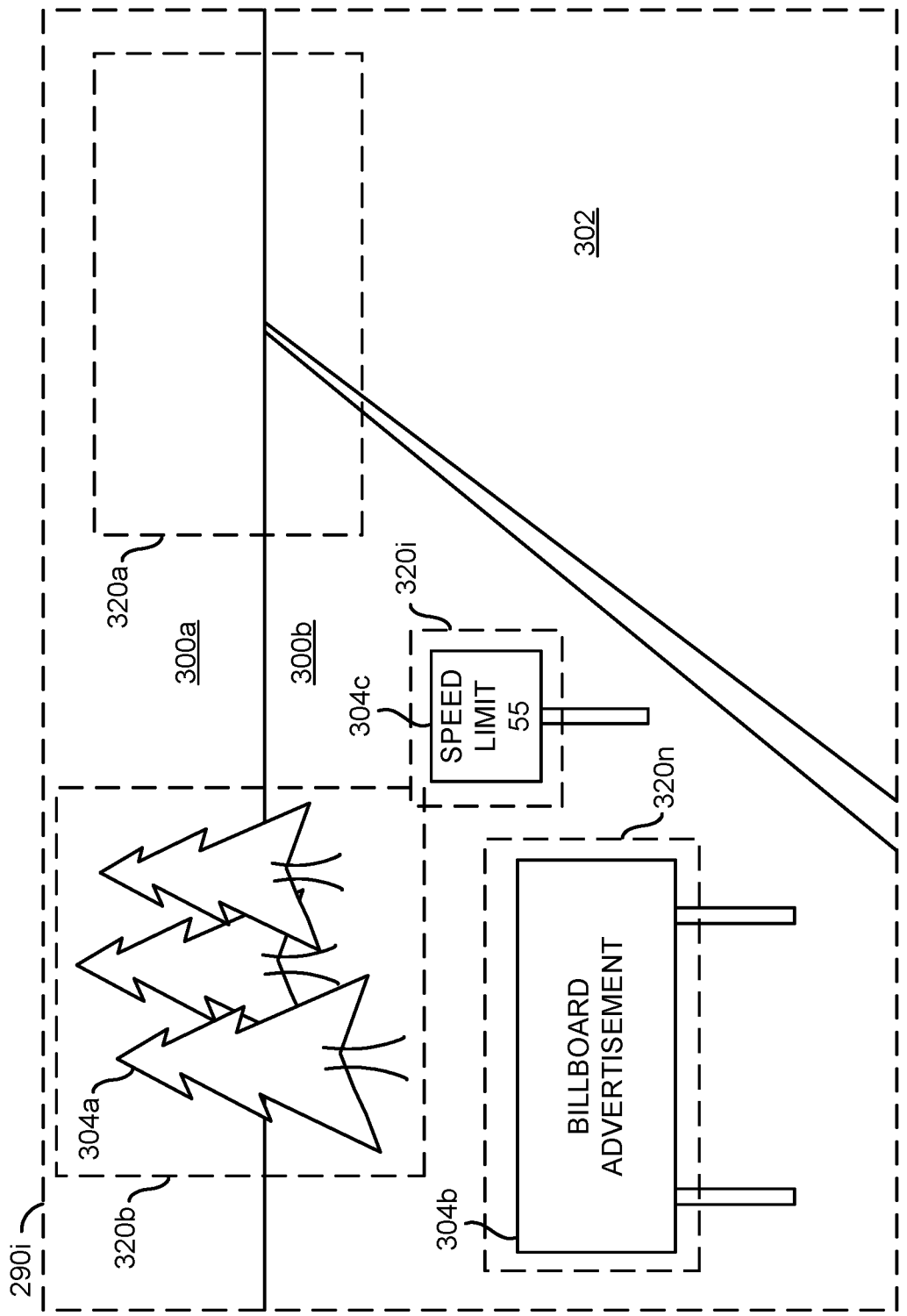
FIG. 6 is a diagram illustrating an example video frame showing potential advertisement locations.

Referring FIG. 6, a diagram illustrating an example video frame showing potential advertisement locations is shown. An example video frame 290i is shown. The example video frame 290i may be a representative example of one of the video frames 290a-290n. In the example shown, the example video frame 290i may be in the video pipeline 156 being analyzed by the processors 106a-106n. While the example video frame 290i is shown as a human viewable image for illustrative purposes, when the processors 106a-106n perform the computer vision operations, the video data extracted and analyzed may not necessarily be in a human readable format.

The non-drivable surfaces 300a-300b are shown in the example video frame 290i. The road (e.g., drivable surface) 302 is shown in the example video frame 290i. In the example shown, no objects are present on the road 302. For example, the example video frame 290i may be representative of a scenario where no event is present (e.g., an appropriate time to display the advertisements 292a-292n).

A number of objects 304a-304c are shown on the portion of the example video frame 290i corresponding to the non-drivable surfaces 300a-300b. In the example shown, the object 304a may be a group of trees, the object 304b may be a billboard and the object 304c may be a speed limit sign.

A number of potential advertisement locations 320a-320n are shown on the example video frame 290i. The advertisement locations 320a-320n may be locations where the processors 106a-106n may insert the advertisements 292a-292n. While the advertisement locations 320a-320n are shown as particular sections of the video frame as an illustrative example, the advertisement locations 320a-320n may be located anywhere on the video frames 290a-290n. In an example, the advertisement locations 320a-320n may generally correspond with the non-drivable surfaces 300a-300b. The potential advertisement locations 320a-320n are shown as dotted boxes for illustrative purposes. The shape of the advertisement locations 320a-320n may not necessarily be rectangular (e.g., the shape may depend on the various stored advertisements 174). In the example shown, no advertisements have been inserted in the example video frame 290i. The number, shape and/or locations of the advertisement locations 320a-320n may be varied according to the design criteria of a particular implementation.

The decision module 158 may be configured to determine whether the advertisement locations 320a-320n are appropriate for inserting one or more of the advertisements 292a-292n. Whether the advertisement locations 320a-320n are appropriate may change based on the detected circumstances, conditions and/or context (e.g., determined based on the computer vision operations and/or the sensor fusion operations). In the example shown, the advertisement location 320a may correspond to an area in the sky region 300a and/or partially on the drivable surface 302. Since there is no event detected, and the road 302 is empty, the advertisement location 320a may be an appropriate location to place one of the advertisements 292a-292n. However, if a vehicle approaches on the road 302 (e.g., appears on the horizon), the advertisement location 320a may become an inappropriate location for the advertisements 292a-292n. In the example shown, the advertisement location 320b may correspond to the trees 304a. For example, the decision module 158 may determine that the trees 304a are a potential obstacle that the driver 202 should be aware of and the advertisement location 320b may be an inappropriate location.

In the example shown, the advertisement 320i may correspond to the object 304c. The decision module 158 may determine that the object 304c comprises important information for the driver 202. For example, the speed limit may generally be considered something that the driver 202 should be made aware of. Since the advertisement location 320i comprises important and/or critical information, the advertisement 320i may be considered an inappropriate location. In the example shown, the advertisement location 320n may correspond with the location of the object 304b. The decision module 158 may determine that the object 304b comprises unimportant information for the driver 202. For example, the advertisement on the billboard 304b (e.g., a roadside advertisement) may not be important and/or critical information that the driver 202 should be ensured to be aware of. Since the advertisement location 320n comprises unimportant information on a non-drivable surface 300b, the advertisement location 320n may be determined to be an appropriate location for inserting the advertisements 292a-292n.

The processors 106a-106n may be configured to constantly continuously and/or periodically monitor the driving conditions, context and/or state of ego vehicle 50 (e.g., the ego vehicle 50 and the surroundings). The monitoring of the state of the ego vehicle 50 may comprise a combination of reading the sensors 114, receiving external information (e.g., weather data and/or location data) and/or performing the computer vision operations. The processors 106a-106n may detect issues (e.g., the events) by analyzing the visual data and correlating the information determined using the computer vision operations with expected behavior to determine whether any of the advertisement locations 320a-320n are appropriate locations for inserting the advertisements 292a-292n.

The computer vision operations implemented by the processors 106a-106n may look for various factors to determine whether or not the advertisement locations 320a-320n are appropriate. In one example, the factors may comprise a proximity to other objects (e.g., the vehicles 252a-252n, the trees 304b, etc.). In another example, the factors may comprise how likely the advertisement locations 320a-320n would cover critical and/or important information (e.g., other vehicles, road signs, lane markings, emergency vehicles, pedestrians, etc.). In yet another example, the factors may comprise traffic density, the presence of pedestrians, the presence of cyclists, etc. The various factors analyzed and/or the method of detecting the factors may be varied according to the design criteria of a particular implementation.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

Figure 7:
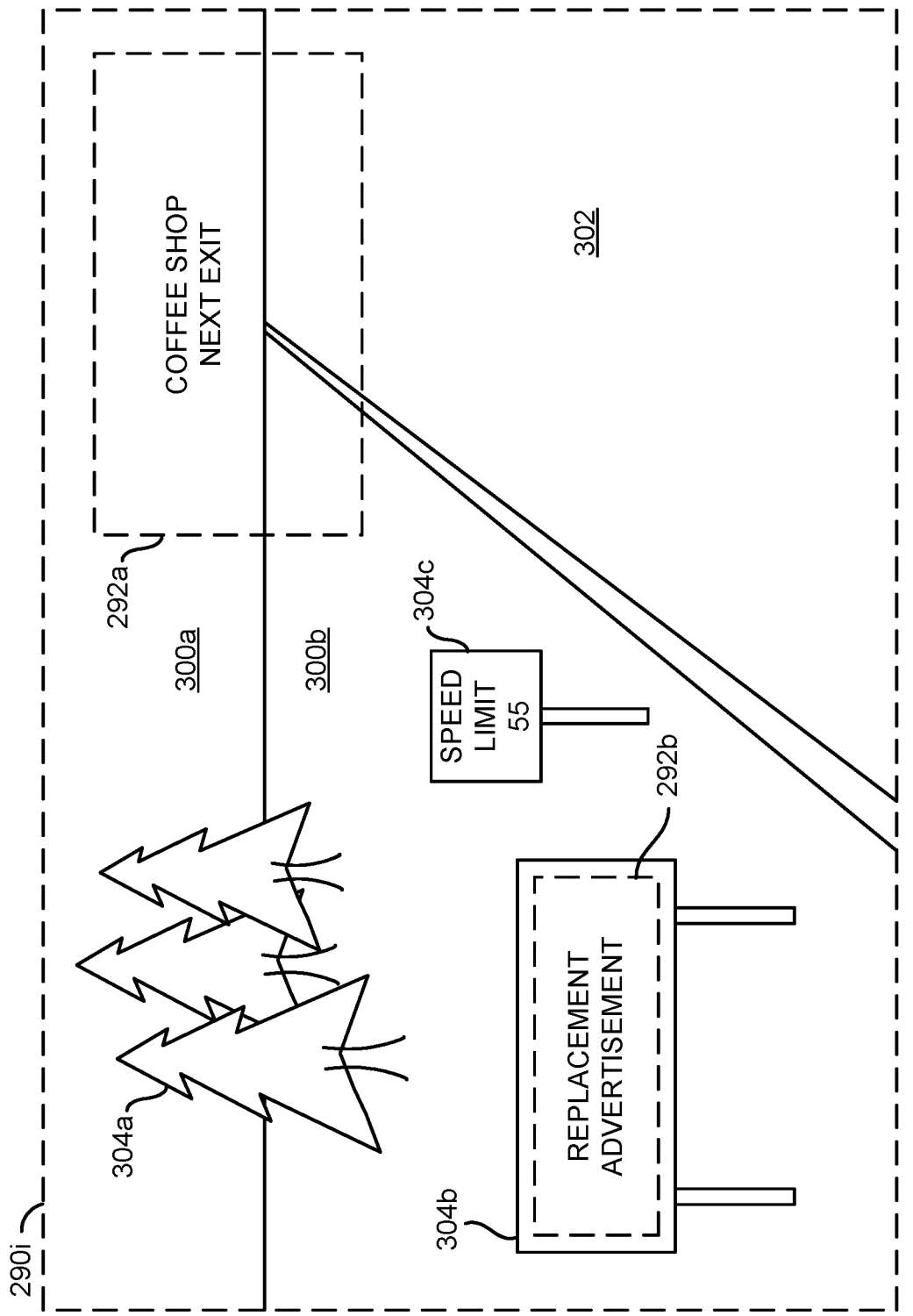
FIG. 7 is a diagram illustrating an example output video frame with inserted advertisements.

Referring to FIG. 7, a diagram illustrating an example output video frame with inserted advertisements is shown. The example video frame 290i is shown. The example video frame 290i may be a representative example of one of the video frames 290a-290n. In the example shown, the example video frame 290i may be output from the video pipeline 156 and output by the processors 106a-106n to one or more of the displays 118a-118n. For example, the video frame 290i may be a human viewable image that would be displayed on a screen. For example, the example output video frame 290i may be output to various viewing applications such as an electronic mirror, a surround view display, a back-up camera, an AR camera, etc. (e.g., one or more of the displays 118a-118n). The example video frame 290i may be an output version of the example video frame 290i shown in association with FIG. 6, after being processed by the processors 106a-106n and sent as the signals VOUT_A-VOUT_N to the displays 118a-118n.

The example video frame 290i may comprise the non-drivable surfaces 300a-300b and the drivable surface 302. The example video frame 290i may comprise the trees 304a, the billboard 304b and the speed limit sign 304c. In the example shown, no event has been detected. The advertisements 292a-292b are shown inserted in the video frame 290*i*. The advertisements 292*a*-292*b* are shown as dotted boxes for illustrative purposes. Generally, the advertisements 292*a*-292*n* may be inserted in the video frames 290*a*-290*n* to appear non-intrusive, seamless with the original video content and/or native to the environment captured in the video frame. In some embodiments, the processors 106*a*-106*n* may further be configured to insert information other than advertisements based on the computer vision (e.g., direction, speed limit warnings, reminders, a schedule, etc.).

The advertisement 292*a* may be inserted/overlaid in the video frame 290*i* corresponding to the appropriate advertisement location 320*a* shown in association with FIG. 6. The advertisement 292*a* may be located in the sky region 300*a* (e.g., the non-drivable surface). In the example shown, the advertisement 292*a* may be a text-based message stating "Coffee Shop Next Exit". Since the advertisement locations 320*b* and/or 320*i* shown in association with FIG. 6 were determined by the decision module 158 to be inappropriate locations, no ads may be inserted corresponding to the advertisement locations 320*b* (e.g., corresponding to the trees 304*b*) and/or 320*i* (e.g., corresponding to the speed limit sign 304*c*).

The advertisement 292*b* may be inserted/overlaid in the video frame 290*i* corresponding to the appropriate advertisement location 320*n* shown in association with FIG. 6. The advertisement 292*b* may be located on the video data corresponding to the billboard 304*b*. In the example shown, the advertisement 292*b* may be a replacement advertisement. For example, if the billboard 304*b* is detected in the rear view mirror, the ad 292*b* may be automatically reformatted and overlaid on top of the billboard 304*b*. In another example, the processors 106*a*-106*n* may read and/or analyze the content of the advertisement on the billboard 304*b* and if the advertisement is one of the advertisements stored in the advertisement storage 174, then the processors 106*a*-106*n* may not replace the billboard 304*b* (e.g., since the same and/or similar ad content may already be displayed).

The advertisements 292*a*-292*n* may be stored in the advertisement storage 174. The advertisements 292*a*-292*n* may comprise text information, image information and/or sound information. The decision module 158 may determine which of the advertisements 292*a*-292*n* to select from the advertisement storage 174 based on a context. The processors 106*a*-106*n* may be configured to adjust (e.g., reformat, resize, alter, rotate, etc.) the advertisements 292*a*-292*n* from the versions stored in the advertisement storage 174 based on the selected advertisement locations 320*a*-320*n* and/or the context of the ad insertion.

The processors 106*a*-106*n* may be configured to select the advertisements 292*a*-292*n* based on a determined context of the ego vehicle 50 and/or the driver 202. In one example, the context may be a location, time of day, as well as objects detected (e.g., hotel room advertisements may be selected at night, restaurant advertisements may be selected at lunch time, vehicle repair shops may be advertised when potholes are detected, etc.). In another example, the processors 106*a*-106*n* may select the advertisements 292*a*-292*n* based on the information of the route traveled by the ego vehicle 50 and/or the predicted route traveled. For example, the sensors 114 may provide information about the amount of fuel remaining and the predicted route may indicate that there is only one gas station available for the next few miles.

In some embodiments, the context of the driver 202 may comprise driver behavior. For example, one or more of the capture devices 102*a*-102*n* may be directed to capture the interior of the ego vehicle 50 and the processors 106*a*-106*n* may analyze video data of the driver 202 and/or other occupants. For example, if the driver 202 has been driving for a long time (e.g., 3 hours) the decision module 158 may select a restaurant advertisement. In another example, if the video analysis of the driver 202 indicates the driver 202 may be drowsy then the decision module 158 may select local coffee shops from the advertisement storage 174.

The driver behavior (including analysis of the gaze direction described in association with FIG. 3) may be one of the factors determined by the sensor fusion module 152. The cameras 102*a*-102*n* configured as interior cameras may be used to determine driver behavior. Further driver behavior input may comprise the way the ego vehicle 50 is being driven (e.g., receiving information from the sensors 114 to monitor steering wheel/gas pedal inputs). The video analysis of the interior of the ego vehicle 50 may incorporate information about the passengers. For example, if there are 5 people in the car, the decision module 158 may decide to offer ads for local restaurants where a table of 5 is available, or a hotel with 2 adjacent rooms available. In another example, if an infant is detected in the ego vehicle 50 then advertisements for baby food may be selected. In yet another example, if a specific person is detected in the ego vehicle 50 then advertisements may be targeted based on the preferences of the specific person (e.g., a person that likes eating at fast food restaurants will receive a fast food advertisement rather than a dine-in restaurant).

The processors 106*a*L-106*n* may be configured to continuously and/or periodically resize the advertisements 292*a*-292*n*. In some embodiments, the advertisements 292*a*-292*n* may be statically located (e.g., the advertisement 292*a* may remain in the sky region 300*a*) and not move along with the other video data. In some embodiments, the advertisements 292*a*-292*n* may be inserted in the video frames 290*a*-290*n* to follow and/or track objects. For example, the advertisement 292*b* may be grouped and/or paired with the billboard 304*b*. As the ego vehicle 50 approaches and then drives past the billboard 304*b*, the size and/or location of the billboard 304*b* may change (e.g., from a small object in the distance to a larger object up close). The processors 106*a*-106*n* may be configured to dynamically adjust the advertisement location for the ad 292*b* to follow the location, size and/or perspective of the billboard 304*b*. The processors 106*a*-106*n* may be configured to dynamically adjust the size of the ad 292*b* to correspond with the size of the billboard 304*b*. For example, the advertisement 292*b* may be reduced to a small size when the billboard 304*b* is in the distance and then gradually increased in size as the billboard 304*b* becomes larger as the ego vehicle 50 moves closer to the billboard 304*b*. The processors 106*a*-106*n* may perform other types of adjustments to the advertisements 292*a*-292*n* (e.g., skew, tilt, stretch, crop, etc.) in response to changes in perspective. For example, to make the advertisement 292*b* appear to be native (e.g., appear as if naturally printed on the billboard 304*b*), the processors 106*a*-106*n* may skew the angle of the advertisement as the perspective changes.

The processors 106*a*-106*n* may be configured to replace video data with the advertisements 292*a*-292*n*. For example, the video data corresponding to the advertisement location 320*a* may be cropped out of the video frame 290*i* and replaced by the video data corresponding to the advertisement 292*a*.

In some embodiments, the processors 106*a*-106*n* may be configured to overlay the advertisements 292*a*-292*n* as layers above and/or below the video data corresponding to the advertisement locations 320*a*-320*n*. In one example, the processors 106*a*-106*n* may overlay the advertisement 292*a* as a layer on top of the video data corresponding to the advertisement location 320a. The processors 106a-106n may be further configured to adjust one or more layers of the video data. For example, if a pedestrian is detected walking and would pass in front of the advertisement location 320a, then while the pedestrian is walking by the advertisement location 320a in the video frame 290i, the advertisement 292a may be moved behind the video data so that the pedestrian is not obscured by the advertisement 292a. When the pedestrian walks past the advertisement location 320a, the layer of the advertisement 292a may be brought in front of the video data corresponding to the advertisement location 320a so that the advertisement 292a becomes visible. The processors 106a-106n may be configured to detect objects using the video analysis and track the locations of objects in the video frames 290a-290n. The objects may be moved in front of the layer of the advertisements 292a-292n (or the advertisements 292a-292n may be moved behind the layer of the detected objects) based on the tracked location of the detected object and the advertisement locations 320a-320n.

Figure 8:
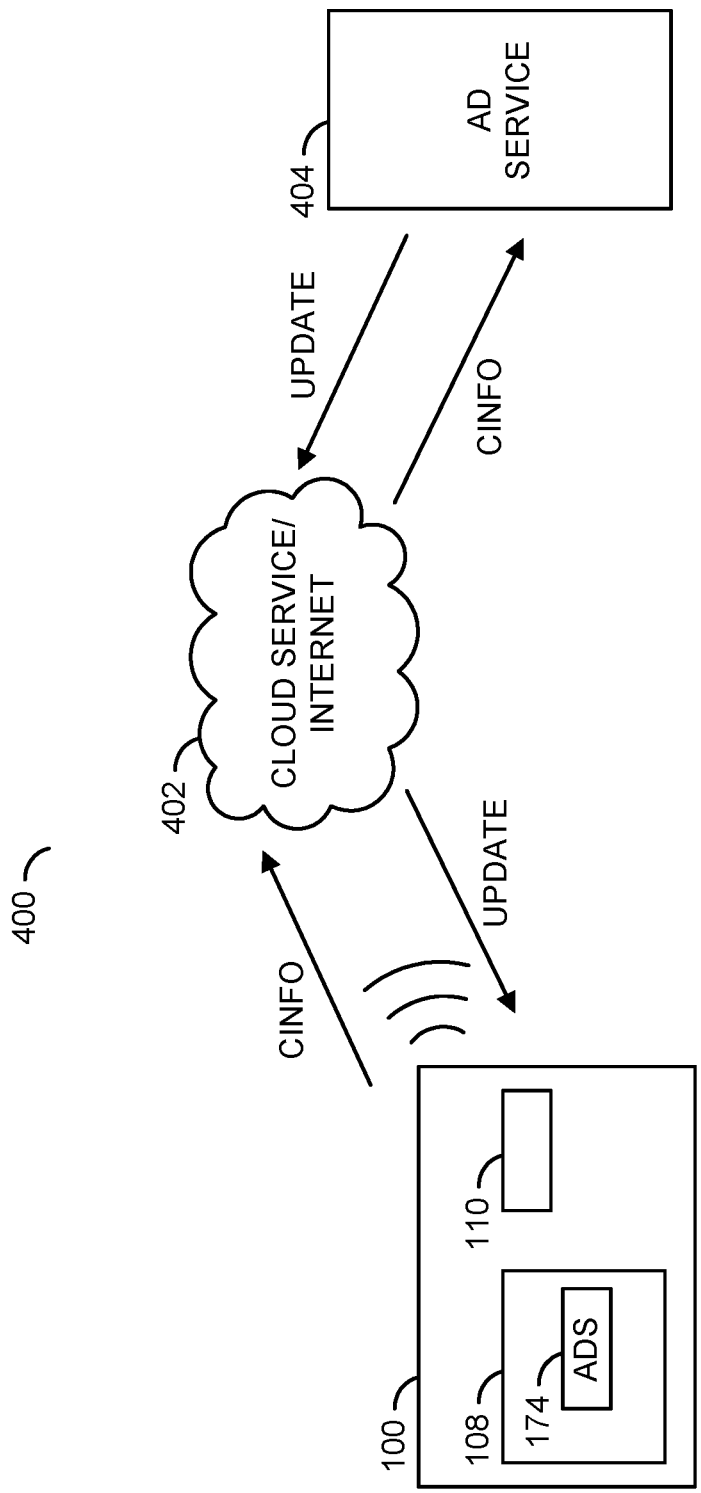
FIG. 8 is a block diagram illustrating an example connection to an ad provider.

Referring to FIG. 8, a block diagram illustrating an example connection to an ad provider is shown. A system 400 is shown. The system 400 may comprise the apparatus 100, a network 402 and/or a block (or circuit) 404. The network 402 may be an internet connection to a cloud service. The block 404 may be an ad service and/or network.

The wireless communication device 110 may be configured to communicate wirelessly with the network 402. The ad service 404 may be configured to communicate with the network 402. A signal (e.g., CINFO) and a signal (e.g., UPDATE) are shown. The signal CINFO may be generated by the apparatus 100 and communicated to the ad service 404. The signal CINFO may comprise context information determined by the processors 106a-106n (e.g., location, inferences made from the video analysis and/or the sensor fusion operations, driver behavior, driver preferences, etc.). The signal UPDATE may comprise updated advertisements and/or context-relevant advertisements. The signal UPDATE may be presented by the ad service 404 to update the advertisements available in the advertisement storage 174.

The apparatus 100 may be configured to pull and/or receive advertisement content from a central advertisement service 404 using an LTE connection. In an example, the advertisements can be updated ads. In another example, the advertisements received in the signal UPDATE may be coupon offers and/or limited time deals based on nearby stores and/or location. For example, when the ego vehicle 50 enters a new area and/or region (e.g., city, state, neighborhood, etc.), the signal CINFO may provide an update for a region for the ego vehicle 50 to the ad service 404. The ad service 404 may read the context information from the signal CINFO and determine which updated ads to send. The selected updated ads may be provided in the signal UPDATE. The apparatus 100 may store the new ads read from the signal UPDATE in the advertisement storage 174. The signal UPDATE may further comprise context information about when to show the ads (e.g., where the restaurant corresponding to the coupon offer is located, what times of day to display particular ads, how often the ad should be displayed based on advertisement agreements made with the businesses, etc.). The system 400 may be configured to use an LTE connection to exchange information with the cloud to provide dynamic advertisements.

The ad service 404 may be configured to store data, retrieve and transmit stored data, process data and/or communicate with other devices. The ad service 404 may be implemented as part of a cloud computing platform (e.g., distributed computing). In an example, the ad service 404 may be implemented as a group of cloud-based, scalable server computers. By implementing a number of scalable servers, additional resources (e.g., power, processing capability, memory, etc.) may be available to process and/or store variable amounts of data. For example, the ad service 404 may be configured to scale (e.g., provision resources) based on demand. The ad service 404 may implement scalable computing (e.g., cloud computing). The scalable computing may be available as a service to allow access to processing and/or storage resources without having to build infrastructure (e.g., the provider of the apparatus 100 may not have to build the infrastructure of the ad service 404). In an example, the ad service 404 may be operated by a separate entity and/or entities than the manufacturer of the apparatus 100 and/or the manufacturer of the ego vehicle 50.

Figure 9:
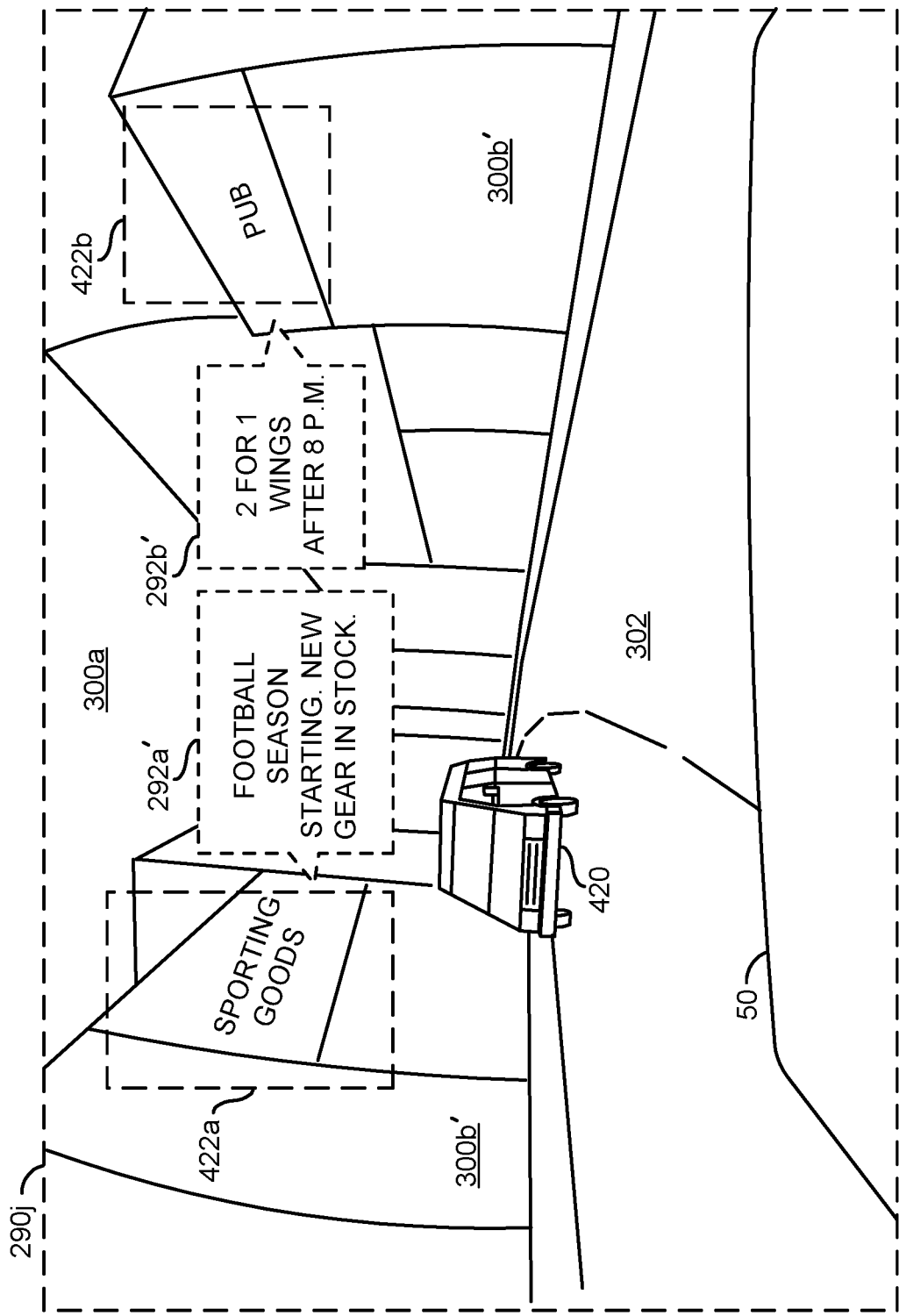
FIG. 9 is a diagram illustrating an example output video frame with context-based pop-up advertisements.

Referring to FIG. 9, a diagram illustrating an example output video frame with context-based pop-up advertisements is shown. An example video frame 290j is shown. The example video frame 290j may be a representative example of one of the video frames 290a-290n. The example video frame 290j may be output from the video pipeline 156 and output by the processors 106a-106n to one or more of the displays 118a-118n. For example, the video frame 290j may be a human viewable image that would be displayed on a screen.

The example video frame 290j may comprise the non-drivable sky region 300a, the non-drivable surfaces 300b' and the drivable surface 302. The non-drivable surface 300b' may comprise buildings and/or storefronts. The hood of the ego vehicle 50 is shown in the example video frame 290j (e.g., the video frame 290j may be captured by a dash-mounted camera). A vehicle 420 is shown driving on the road 302. Since the vehicle 420 is on the road 302, none of the advertisements 292a-292n may be displayed on the road section of the video frame 290j (e.g., the advertisement locations 320a-320n may be considered inappropriate locations for ad insertion).

Dotted boxes 422a-422b are shown. The dotted boxes 422a-422b may represent the computer vision analysis performed by the processors 106a-106n detecting objects. The dotted boxes 422a-422b may be illustrative examples of the object detection and may not be visible on the output shown on the displays 118a-118n.

In the example shown, the object 422a may be a sporting goods storefront. In the example shown, the object 422b may be a pub storefront. The processors 106a-106n may be configured to determine appropriate ads to insert based on the detected storefronts. In some embodiments, the wireless communication devices 110 may be configured to retrieve updated and/or context-relevant ads from the ad service 404.

The advertisements 292a'-292b' are shown inserted in the example video frame 290j. In some embodiments, the processors 106a-106n may be configured to overlay the ads 292a'-292b' on top of the shops 422a-422b. In the example shown, the advertisements 292a'-292b' may appear as a virtual pop-up type notification with a box pointer pointing to the respective shops 422a-422b. The pop-up type advertisements 292a'-292b' may be a type of advertisement intended to be understood as a virtual ad (e.g., non-native appearance, not part of the actual environment, etc.). In another example, the pop-up advertisements 292a'-292b' may be overlaid onto the shop windows. The configuration of the pop-up advertisements 292a'-292b' may be varied according to the design criteria of a particular implementation.

In the example shown, the pop-up ad 292a' may correspond to the sporting goods store 422a. The pop-up ad 292a' is shown as a text-only ad with the text "Football season starting. New gear in stock". For example, the processors 106a-106n may aggregate the context information (e.g., the location, the store type, the time of year, the interests of the driver 202, etc.) to generate a context-based advertisement. For example, the ad service 404 may comprise aggregated information about the interests and/or habits of the driver 202. Based on personal preferences of the driver 202 the ad service 404 and/or the processors 106a-106n may know that the driver 202 is a football fan. Using the context information about the driver 202 (e.g., football is a relevant interest) and the context information about the time of year (e.g., late summer/early autumn when football season starts), and the type of store detected (e.g., a sporting goods store detected using computer vision analysis), the decision module 158 may select an ad for football equipment.

In the example shown, the pop-up ad 292b' may correspond to the pub/restaurant 422b. The pop-up ad 292b' is shown as a text-only ad with the text "2 for 1 wings after 8 P.M.". For example, the processors 106a-106n may aggregate the context information (e.g., the location, the store type, the time of day, when the driver 202 last stopped for food, etc.) to generate the context-based advertisement. For example, the driver 202 may be driving by the pub 422b on a Wednesday at 7:50 P.M. The processors 106a-106n may detect the pub 422b and send the signal CINFO to the ad service 404. The ad service 404 may analyze the context information and search for deals corresponding to the particular pub 422b at or near the time of day. The ad service 404 may find an ad for two for one wings on Monday nights after 8 P.M., which corresponds to the day of the week and is close to the current time. The ad service 404 may send the ad via the signal UPDATE. The processors 106a-106n may update the ad storage 174 based on the signal UPDATE and select the ad 292b' to insert into the example video frame 290j.

Figure 10:
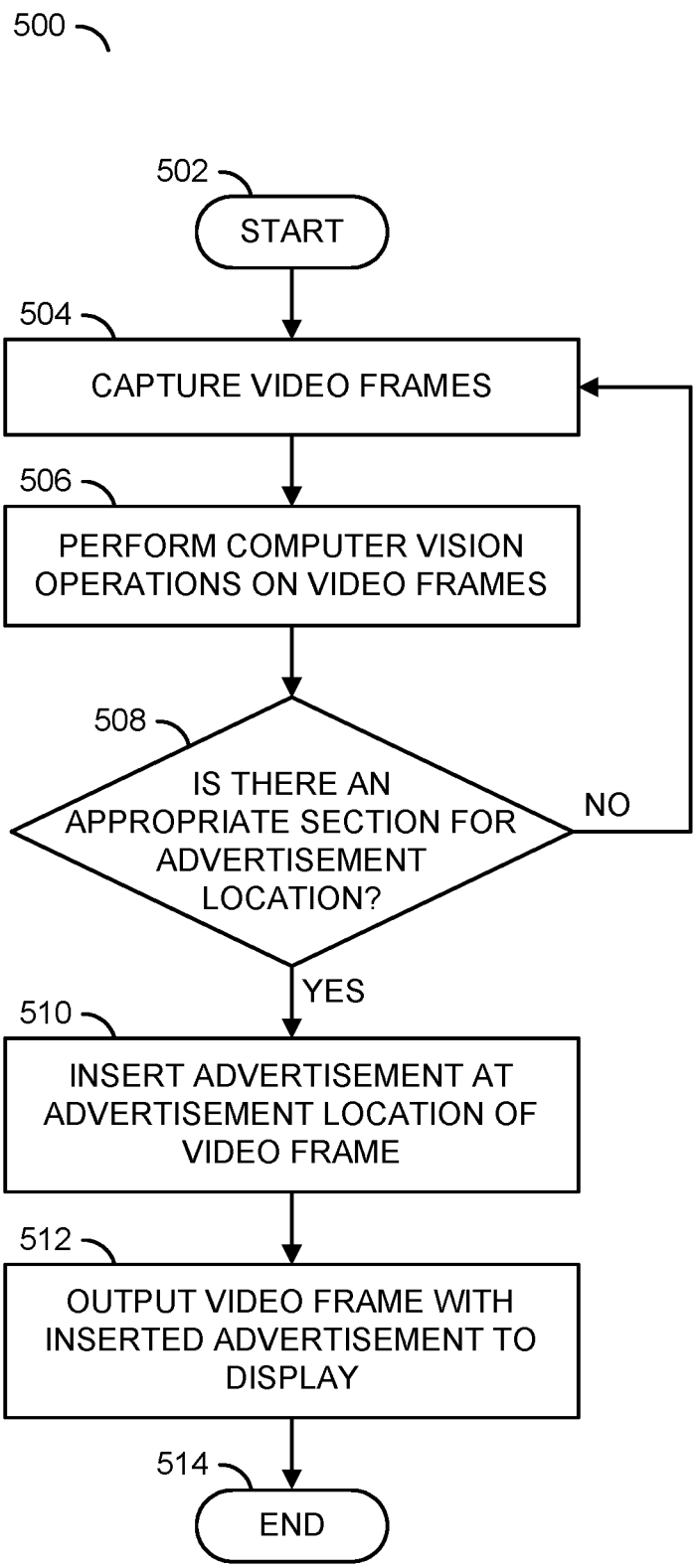
FIG. 10 is a flow diagram illustrating a method for inserting advertisements in an output video frame.

Referring to FIG. 10, a method (or process) 500 is shown. The method 500 may insert advertisements in an output video frame. The method 500 generally comprises a step (or state) 502, a step (or state) 504, a step (or state) 506, a decision step (or state) 508, a step (or state) 510, a step (or state) 512, and a step (or state) 514.

The step 502 may start the method 500. In the step 504, one or more of the capture devices 102a-102n may capture the video frames FRAMES_A-FRAMES_N of the environment near the ego vehicle 50. Next, in the step 506, the processors 106a-106n may perform computer vision operations on the video frames FRAMES_A-FRAMES_N. In an example, the CNN module 150 may be configured to detect objects in the video frames. Next, the method 500 may move to the decision step 508.

In the decision step 508, the decision module 158 may determine whether there is an appropriate section for an advertisement location. In an example, the decision module 158 may analyze the results of the computer vision operations to detect one or more of the potential advertisement locations 320a-320n and determine whether the advertisement locations 320a-320n are appropriate for placing the advertisements 292a-292n. If there are no appropriate advertisement locations, the method 500 may return to the step 504. In one example, if an event is detected (e.g., high traffic density), then there may be no appropriate ad locations. If one or more of the advertisement locations 320a-320n is determined to be appropriate, then the method 500 may move to the step 510.

In the step 510, the processors 106a-106n may insert one or more of the advertisements 292a-292n at one or more of the advertisement locations 320a-320n that have been determined to be appropriate. For example, the processors 106a-106n may insert and/or overlay the advertisements 292a-292n while the video frames FRAMES_A-FRAMES_N are within the video pipeline 156. The video pipeline 156 may be configured to modify (e.g., rotate, stretch, shrink, crop, adjust colors, decolor, etc.) the advertisements stored by the advertisement storage 174 when inserting the advertisements 292a-292n. Next, in the step 512, the processors 106a-106n may output the video frames 290a-290n with the inserted advertisements 292a-292n to one or more of the displays 118a-118n. For example, the processors 106a-106n may present the video output signals VOUT_A-VOUT_N comprising the video frames with the inserted advertisements to the displays 118a-118n. Next, the method 500 may move to the step 514. The step 514 may end the method 500.

Figure 11:
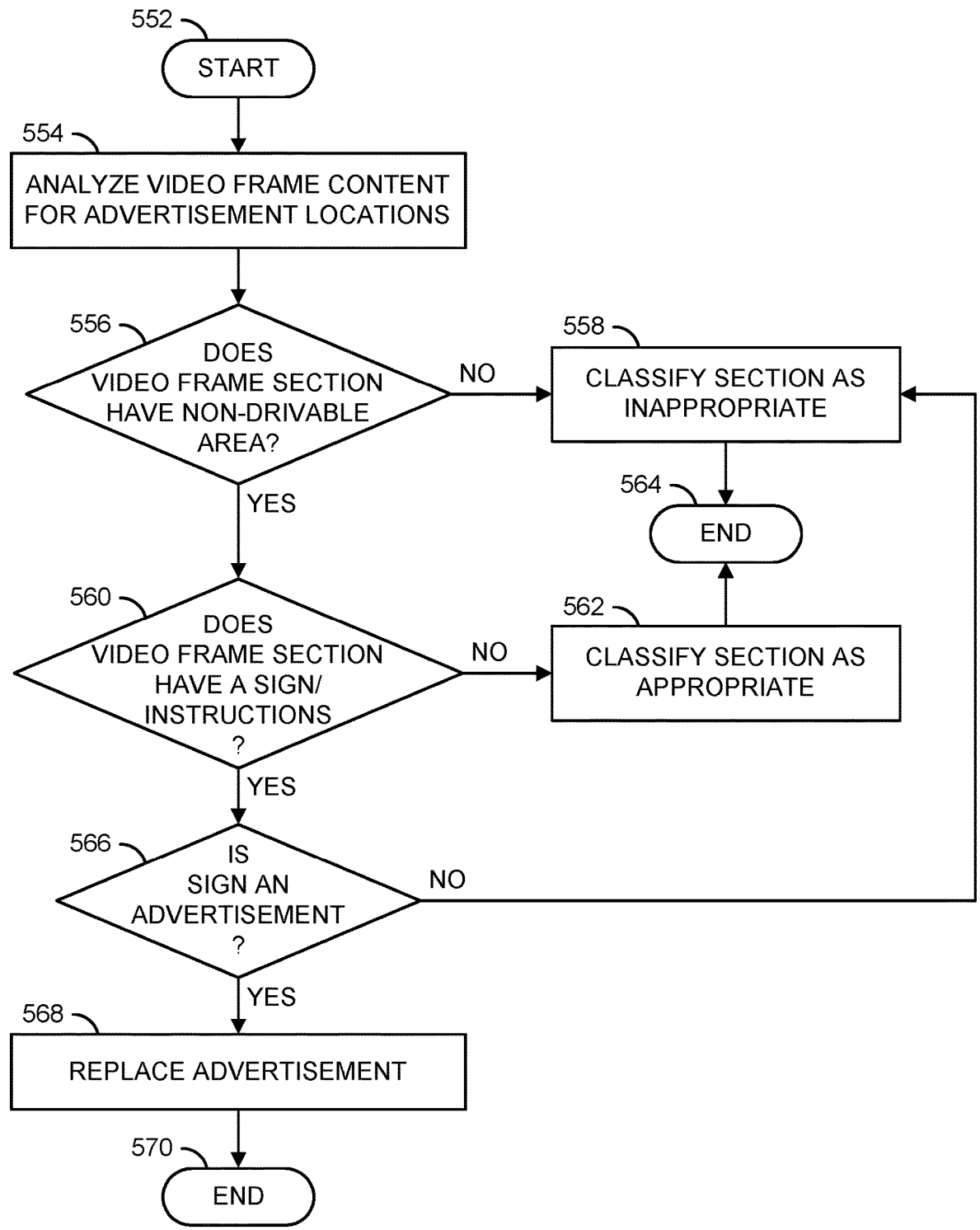
FIG. 11 is a flow diagram illustrating a method for classifying sections of a video frame for advertisement insertion.

Referring to FIG. 11, a method (or process) 550 is shown. The method 550 may classify sections of a video frame for advertisement insertion. The method 550 generally comprises a step (or state) 552, a step (or state) 554, a decision step (or state) 556, a step (or state) 558, a decision step (or state) 560, a step (or state) 562, a step (or state) 564, a decision step (or state) 566, a step (or state) 568, and a step (or state) 570.

The step 552 may start the method 550. In the step 554, the processors 106a-106n may analyze the content of the video frames FRAMES_A-FRAMES_N for the advertisement locations 320a-320n. Next, the method 550 may move to the decision step 556.

In the decision step 556, the processors 106a-106n may determine whether the sections of the video frames 290a-290n with the advertisement locations 320a-320n have one or more of the non-drivable areas 300a-300n. If the video frame section does not have any of the non-drivable areas 300a-300n, then the method 550 may move to the step 558. In the step 558, the processors 106a-106n may classify the advertisement locations 320a-320n that are not on non-drivable areas 300a-300n (e.g., areas that correspond to the drivable area 302) as inappropriate. Next, the method 550 may move to the step 564. In the decision step 556, if the video frame section does have the non-drivable areas 300a-300n, the method 550 may move to the decision step 560.

In the decision step 560, the processors 106a-106n may determine whether the sections of the video frames 290a-290n with the advertisement locations 320a-320n have objects 304a-304n that correspond to a sign/instructions. For example, the billboard 304b and/or the speed limit sign 304c shown in association with FIG. 6 may be a sign/instructions. If the video frame does not have any signs/instructions, the method 550 may move to the step 562. In the step 562, the decision module 562 may classify the section as appropriate (e.g., one of the advertisements 292a-292n may be inserted). For example, the non-drivable area that does not have a sign may be an empty sky and/or an empty field. Next, the method 550 may move to the step 564. The step 564 may end the method 550. In the decision step 560, if the video frame section does not have a sign/instructions, then the method 550 may move to the decision step 566.

In the decision step 566, the processors 106a-106n may determine whether the detected signs comprise an advertisement. In one example, the speed limit sign 304c may not be an advertisement (e.g., the speed limit sign 304c may provide important and/or critical information). In another example, the billboard 304b may be an advertisement (e.g., unimportant information and/or information that does not need to be seen by the driver 202). If the sign is not an advertisement, the method 550 may move to the step 558 (e.g., classify the advertisement location as inappropriate). If the sign is an advertisement, the method 550 may move to the step 568. In the step 568, the processors 106a-106n may replace the advertisement on the billboard 304b with one of the advertisements 292a-292n. Next, the method 550 may move to the step 570. The step 570 may end the method 550.

Figure 12:
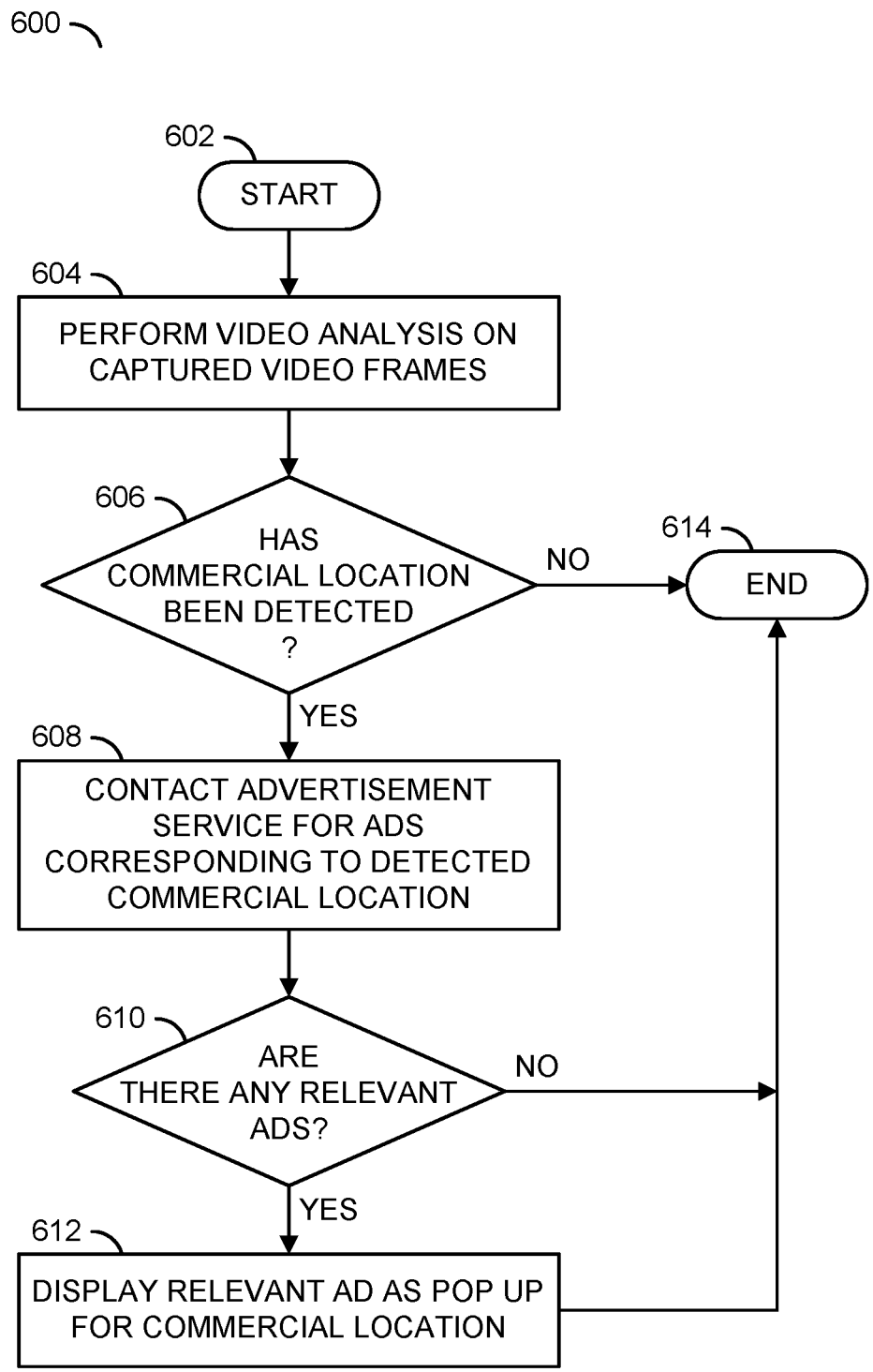
FIG. 12 is a flow diagram illustrating a method for displaying relevant ads.

Referring to FIG. 12, a method (or process) 600 is shown. The method 600 may display relevant ads. The method 600 generally comprises a step (or state) 602, a step (or state) 604, a decision step (or state) 606, a step (or state) 608, a decision step (or state) 610, a step (or state) 612, and a step (or state) 614.

The step 602 may start the method 600. In the step 604, the CNN module 150 may perform the video analysis on the captured video frames FRAMES_A-FRAMES_N. Next, the method 600 may move to the decision step 606.

In the step 606, the decision module 158 may determine whether the commercial locations 422a-422n have been detected. In an example, the commercial locations 422a-422n may be storefronts detected. If no commercial locations 422a-422n have been detected, the method 600 may move to the step 614. If one or more of the commercial locations 422a-422n have been detected, the method 600 may move to the step 608. In the step 608, the communication device 110 may contact the advertisement service 404 (e.g., via LTE communication). Next, the method 600 may move to the decision step 610.

In the decision step 610, the advertisement service 404 may determine whether there are any relevant ads. In one example, the ads may be relevant based on the type of commercial location, the specific commercial location detected, the time of day, the region, the preferences of the driver 202, etc. If there are not any relevant ads, the method 600 may move to the step 614. If there are relevant ads, the method 600 may move to the step 612. In the step 612, then the processors 106a-106n may output the video signals VOUT_A-VOUT_N to the displays 118a-118n with the relevant ads displayed as pop-up ads 292a'-292n' for the commercial locations 422a-422n. For example, the advertisement service 404 may communicate the relevant ads to the communication device 110. The processors 106a-106n may receive the relevant ads and overlay the relevant ads onto the video frames 290a-290n in the video pipeline 156. Next, the method 600 may move to the step 614. The step 614 may end the method 600.

Figure 13:
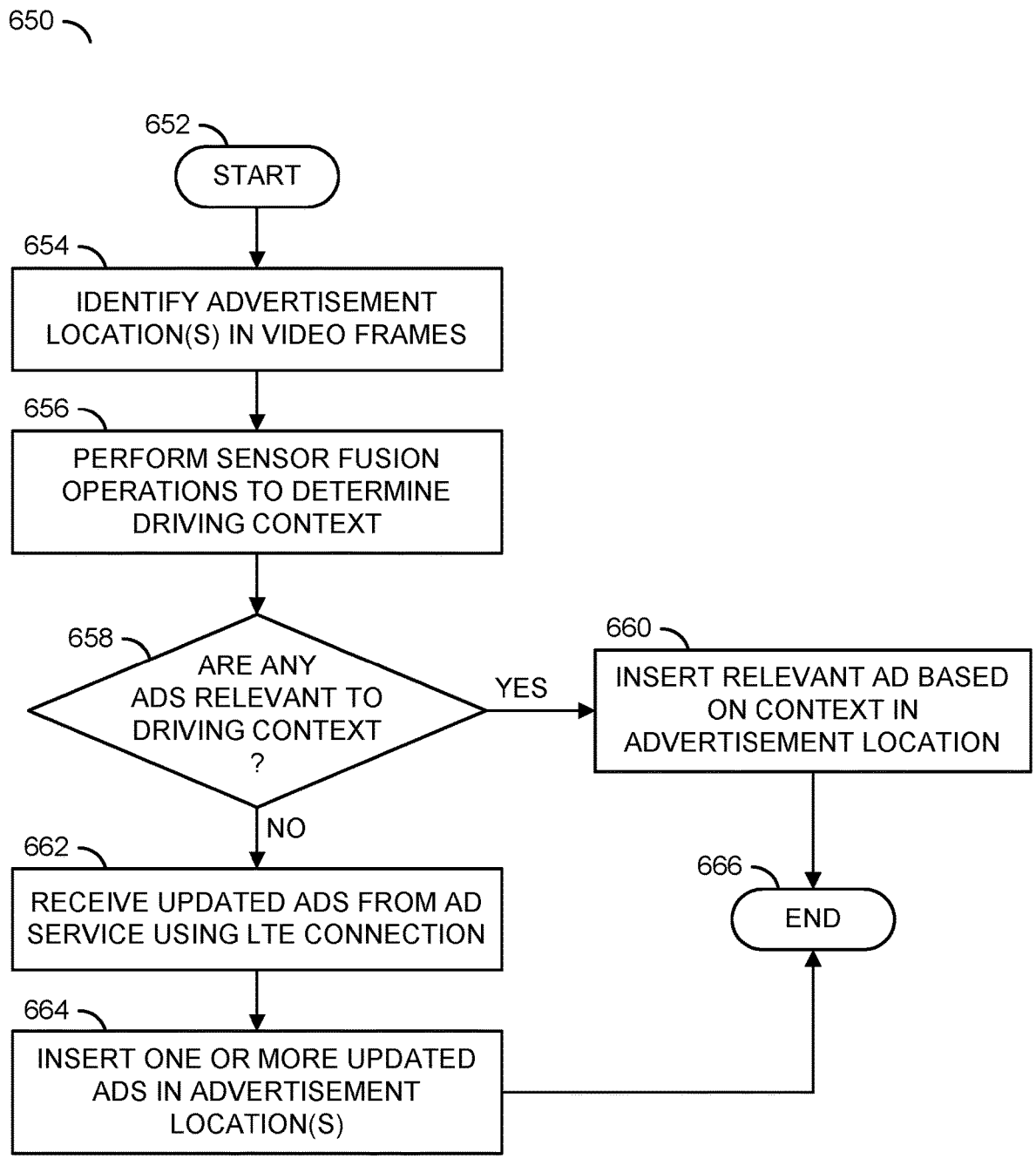
FIG. 13 is a flow diagram illustrating a method for receiving ads from an advertisement provider.

Referring to FIG. 13, a method (or process) 650 is shown. The method 650 may receive ads from an advertisement provider. The method 650 generally comprises a step (or state) 652, a step (or state) 654, a step (or state) 656, a decision step (or state) 658, a step (or state) 660, a step (or state) 662, a step (or state) 664, and a step (or state) 666.

The step 652 may start the method 650. Next, in the step 654, the processors 106a-106n may identify the advertisement locations 320a-320n in the video frames 290a-290n. In the step 656, the sensor fusion module 152 may perform sensor fusion operations to determine the driving context. In an example, the sensor fusion operations may aggregate information such as temperature, time of day, how long the driver has been driving, whether the driver 202 is alone, etc. For example, if the weather is cold and the driver 202 is driving late, then the driving context may be that the driver 202 is cold and tired (e.g., a coffee shop might be a relevant ad). In another example, if the driver 202 has been driving a long time and it is late at night, then the driving context may be that the driver 202 is sleepy and not alert (e.g., a relevant ad may be a hotel). In yet another example, if the driver 202 has been driving a long time and it is in the late afternoon, then the driving context may be that the driver 202 is hungry (e.g., a relevant ad may be a restaurant). Next, the method 650 may move to the decision step 658.

In the decision step 658, the decision module 158 may determine whether there are any ads relevant to the current driving context. For example, the decision module 158 may query the ad storage 174 for relevant ads (e.g., hotel ads for a driving tired context). If there are relevant ads, then the method 650 may move to the step 660. In the step 660, the processors 106a-106n may insert the relevant ads 292a-292n determined based on the driving context in the advertisement locations 320a-320n that have been determined to be appropriate. Next, the method 650 may move to the step 666.

In the decision step 658, if there are not relevant ads, then the method 650 may move to the step 662. In the step 662, the communication device 110 may receive updated ads from the ad service 404. For example, the communication device 110 may transmit the signal CINFO to the ad service 404 to provide the current driving context. The ad service 404 may select up-to-date relevant ads based on the current driving context and communicate the relevant ads as the signal UPDATE. The processors 106a-106n may store the updated ads in the advertisement storage 174. Next, in the step 664, the processors 106a-106n may insert one or more of the updated ads in the advertisement locations 320a-320n that have been determined to be appropriate. Next, the method 650 may move to the step 666. The step 666 may end the method 650.

Figure 14:
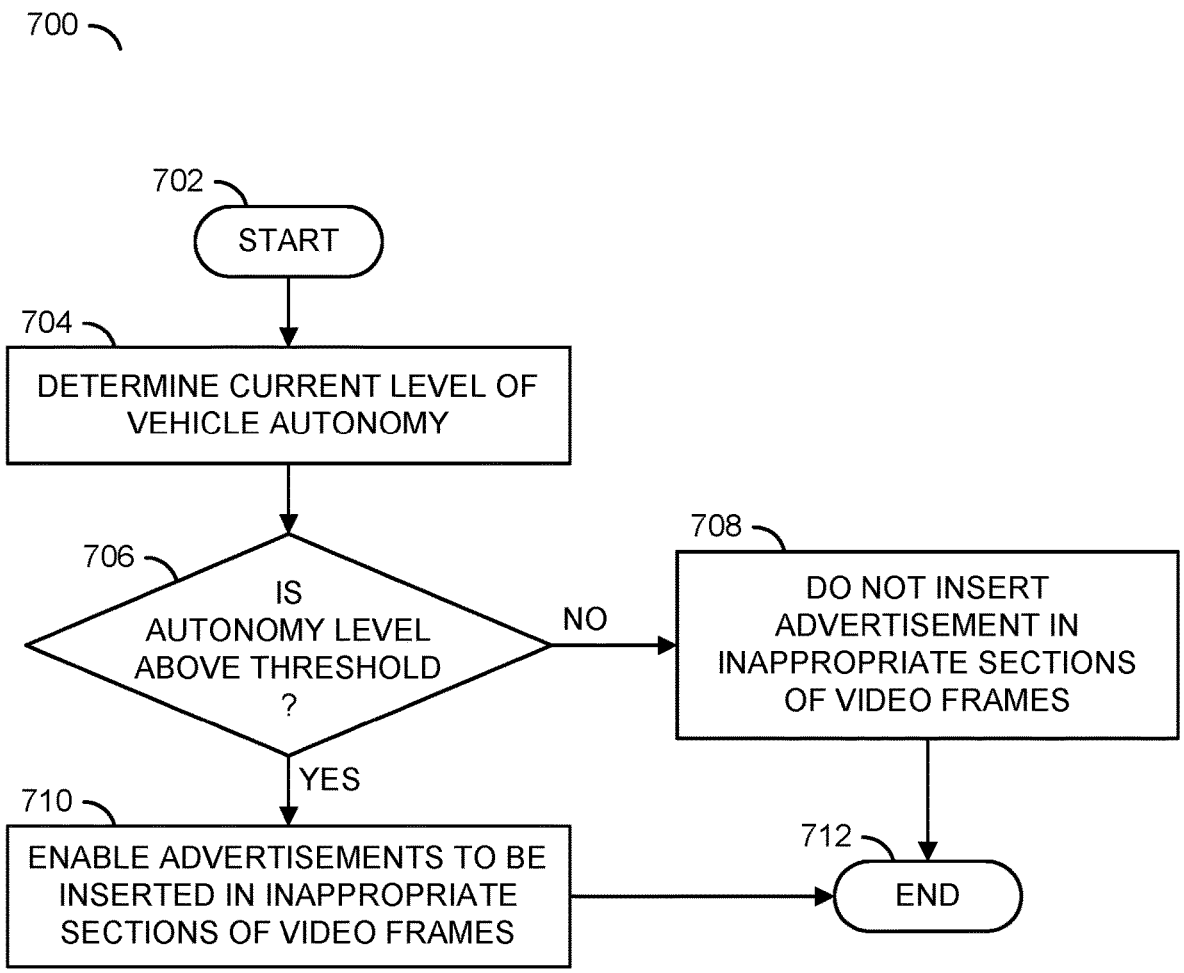
FIG. 14 is a flow diagram illustrating a method for selecting ad locations based on vehicle autonomy.

Referring to FIG. 14, a method (or process) 700 is shown. The method 700 may select ad locations based on vehicle autonomy. The method 700 generally comprises a step (or state) 702, a step (or state) 704, a decision step (or state) 706, a step (or state) 708, a step (or state) 710, and a step (or state) 712.

The step 702 may start the method 700. In the step 704, the processors 106a-106n may determine the current level of vehicle autonomy. For example, various components of the ego vehicle 50 may provide information to the interface 104. In one example, the information provided to the interface 104 may indicate a level of autonomous driving of the ego vehicle 50. In another example, the interface 104 may receive information from the sensors 114 and/or the actuators 116 and interpret the information to determine a level of autonomous driving of the ego vehicle 50. The level of autonomy may be an industry-defined value and/or a determination made by the decision module 158. Next, the method 700 may move to the decision step 706.

In the decision step 706, the decision module 158 may determine whether the autonomy level of the ego vehicle 50 is above a threshold (e.g., a threshold for a next level of autonomy). For example, each level of autonomy of the ego vehicle 50 may have one or more criteria and/or standards for the capability of the ego vehicle 50. In one example, a low level of autonomous driving may involve the driver 202 having complete control of the ego vehicle 50. In another example, a level of autonomy may comprise various driver assist features (e.g., the driver 202 still controls the ego vehicle 50 but automatic assistance is provided by the ego vehicle 50 such as lane centering and automatic braking). In still another example, a high level of autonomy may be when the driver does not need to provide any control of the ego vehicle 50. For each level of autonomy different advertisement locations 320a-320n may be considered appropriate. For example, with some driver assistance, the driver 202 may be able to have more ads presented but in non-distracting areas (e.g., more ads may be presented on the non-drivable areas 300a-300n, but ads on the road 302 may be restricted). In another example, with no driver assistance features, ads may be restricted to a lesser amount and/or ad replacement may be the only appropriate locations. In yet another example, if the level of autonomy of the vehicle enables the speed of the ego vehicle 50 to be controlled autonomously then some information, such as the speed limit sign 304c, may be considered an appropriate location (but would be considered in appropriate if the driver 202 controls the vehicle speed). The various levels of autonomy and/or the amount and/or locations of advertisements considered to be appropriate for each level of autonomous driving may be varied according to the design criteria of a particular implementation.

In the decision step 706, if the level of autonomy is not above the threshold amount, then the method 700 may move to the step 708. In the step 708, the processors 106a-106n may not insert the advertisements 292a-292n into the sections of the video frames 290a-290n that would be considered inappropriate. Next, the method 700 may move to the step 712. In the decision step 706, if the level of autonomy is above the threshold amount, then the method 700 may move to the step 710. In the step 710, the decision module 158 may enable advertisements to be inserted in sections of the video frames 290a-290n that may be considered inappropriate (e.g., inappropriate at a lower level of autonomy). Next, the method 700 may move to the step 712. The step 712 may end the method 700.

The decision module 158 may be configured to decide how and when to display the ads 292a-292n based on potential safety concerns. Generally when the ego vehicle 50 has a high level of autonomy, the driver 202 may be able to be distracted without affecting a likelihood of a collision. For example, if the vehicle is currently in level 3 mode (hands off, mind off) the decision module 158 may enable the display of ads that may be considered distracting in a lower level of autonomy. For example, if the driver 202 does not have to pay attention when driving, then the advertisements 292a-292n may be overlaid on top of vehicles and/or pedestrians (e.g., on the road 302) without fear of creating a safety hazard.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:
1. An apparatus comprising:
   a capture device connected to a vehicle and configured to generate a plurality of video frames of an environment near an outside of said vehicle; and a processor configured to (i) receive video frames from said capture device, (ii) perform video operations to detect objects in said video frames, (iii) determine one or more advertisement locations in said video frames based on said objects detected in said video frames, (iv) insert an advertisement at said advertisement locations and (v) generate video data for a display mounted in said vehicle, wherein said video data comprises said video frames with said inserted advertisement.

2. The apparatus according to claim 1, wherein said advertisement locations are determined by distinguishing appropriate sections of said video frames from inappropriate sections of said video frames.

3. The apparatus according to claim 2, wherein said appropriate sections comprise non-drivable surface in said objects in said video frames.

4. The apparatus according to claim 2, wherein said inappropriate sections comprise traffic signs, drivable surfaces and obstacles.

5. The apparatus according to claim 1, wherein said inserted advertisement is reformatted and overlaid on top of said advertisement locations.

6. The apparatus according to claim 1, wherein said inserted advertisement comprises a virtual pop up at said advertisement locations.

7. The apparatus according to claim 1, wherein said inserted advertisement is selected based on a context.

8. The apparatus according to claim 7, wherein said apparatus is further configured to determine said context based on at least one of a location, a time of day, said detected objects, driver behavior or route information.

9. The apparatus according to claim 1, further configured to connect to a cloud service, wherein (i) said processor selects said inserted advertisement from a plurality of advertisements and (ii) said cloud service provides updates for said plurality of advertisements.

10. The apparatus according to claim 9, wherein said apparatus is configured to connect to said cloud service using a LTE connection.

11. The apparatus according to claim 1, wherein said display comprises at least one of an electronic mirror, a surround view monitor, an infotainment system, or a backup camera display.

12. The apparatus according to claim 1, wherein said capture device is one of a plurality of capture devices.

13. The apparatus according to claim 1, wherein said capture device comprises at least one of an infrared camera, a depth measuring camera or a Bayer color camera.

14. The apparatus according to claim 1, wherein the processor is further configured to determine when to insert said advertisement in response to detected driving conditions.

15. The apparatus according to claim 14, wherein said driving conditions comprise a level of autonomous driving.

16. The apparatus according to claim 14, wherein (i) said processor is further configured to implement sensor fusion and (ii) said sensor fusion is configured to combine information from said video operations with information received from a plurality of sensors of said vehicle to make inferences about said driving conditions.

17. The apparatus according to claim 1, wherein said apparatus is configured to overlay said advertisement on a camera feed in and automotive viewing application.

18. The apparatus according to claim 2, wherein said appropriate sections comprise a roadside advertisement in said objects in said video frames.

* * * * *